Oct. 27, 1931.  A. M. ROSSMAN  1,828,949
ELECTRIC TRACTION
Filed May 27, 1929  13 Sheets-Sheet 3
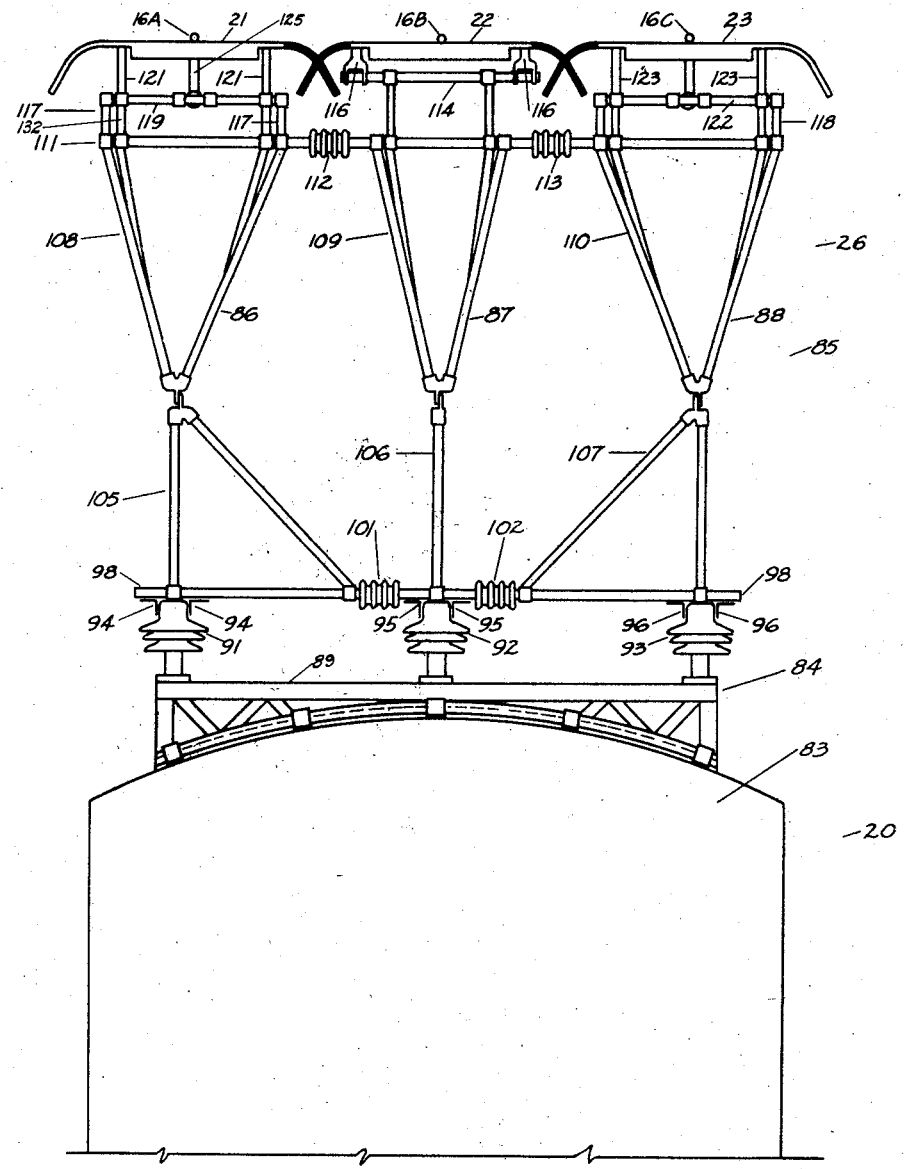

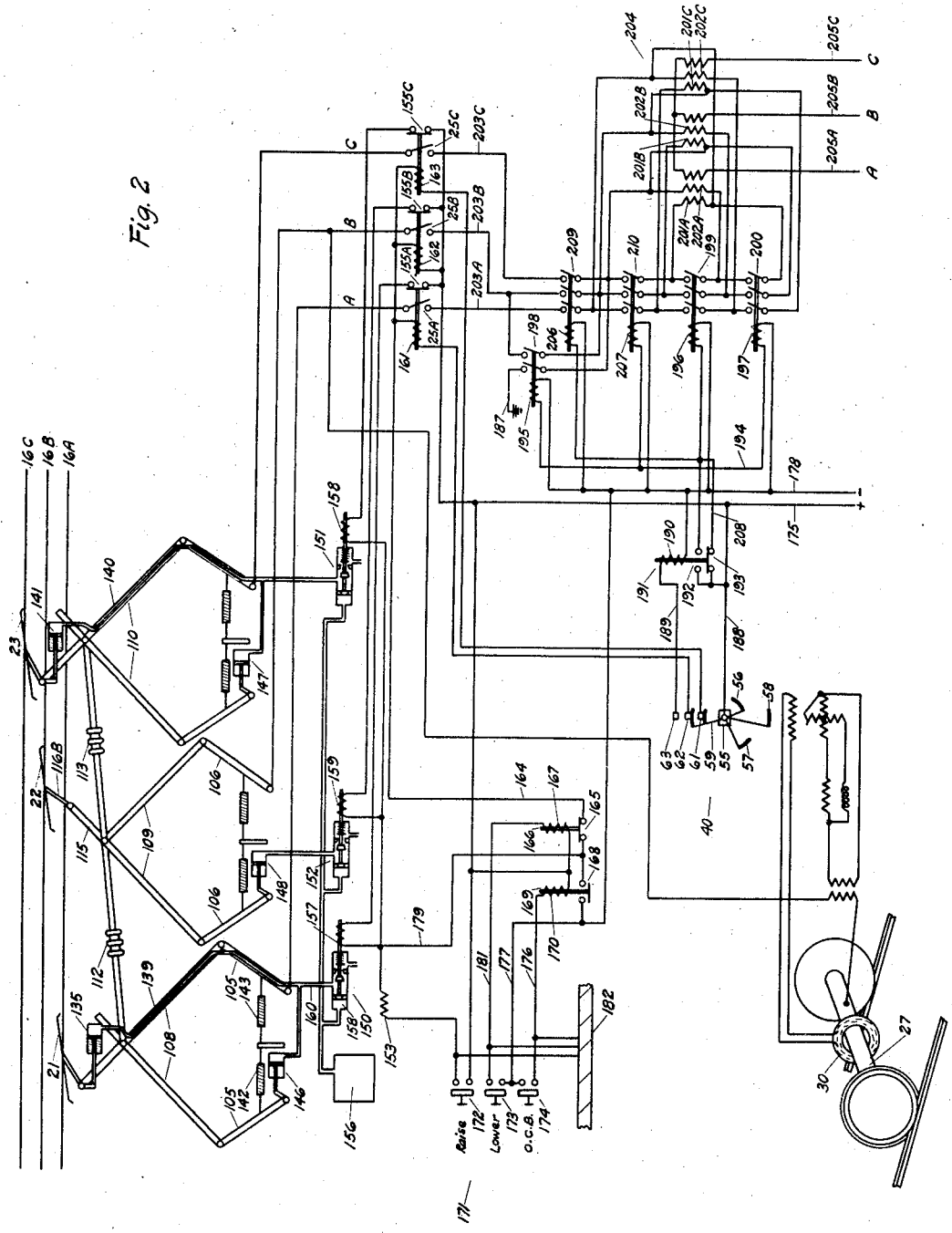

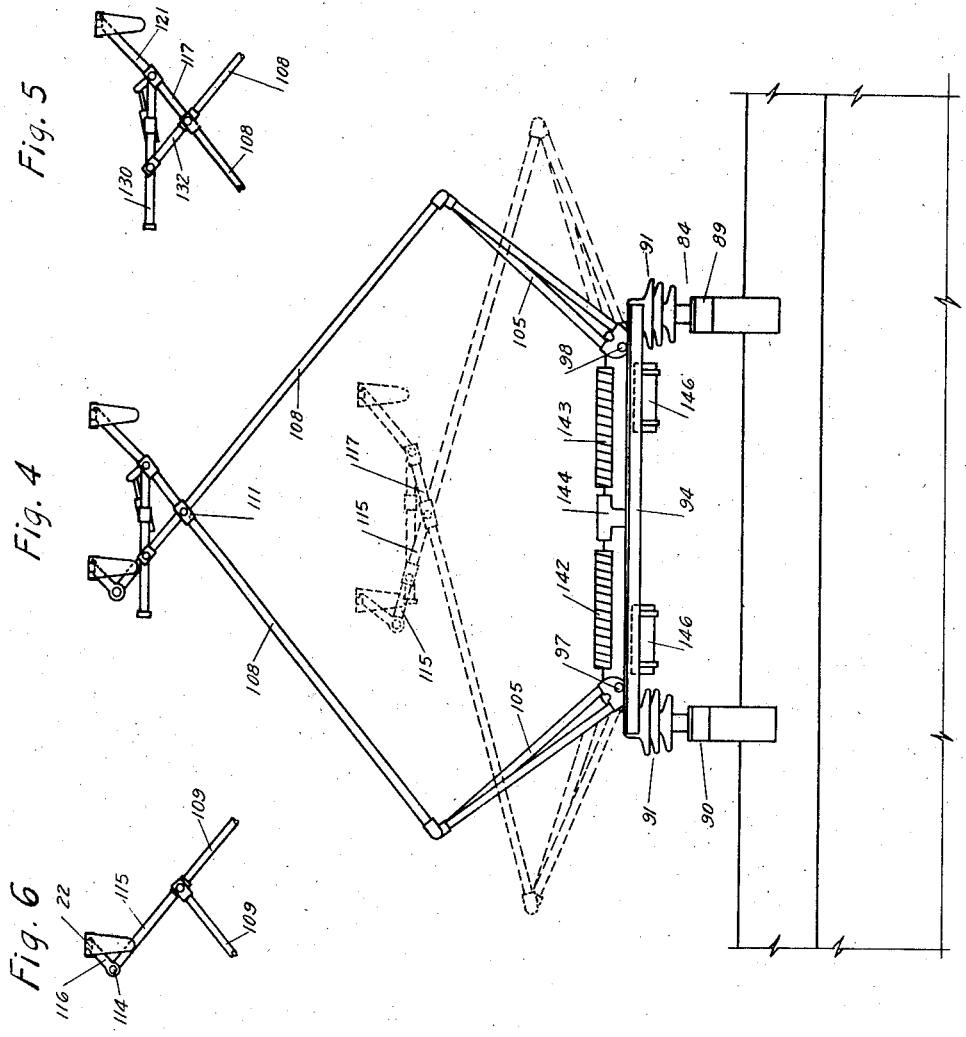

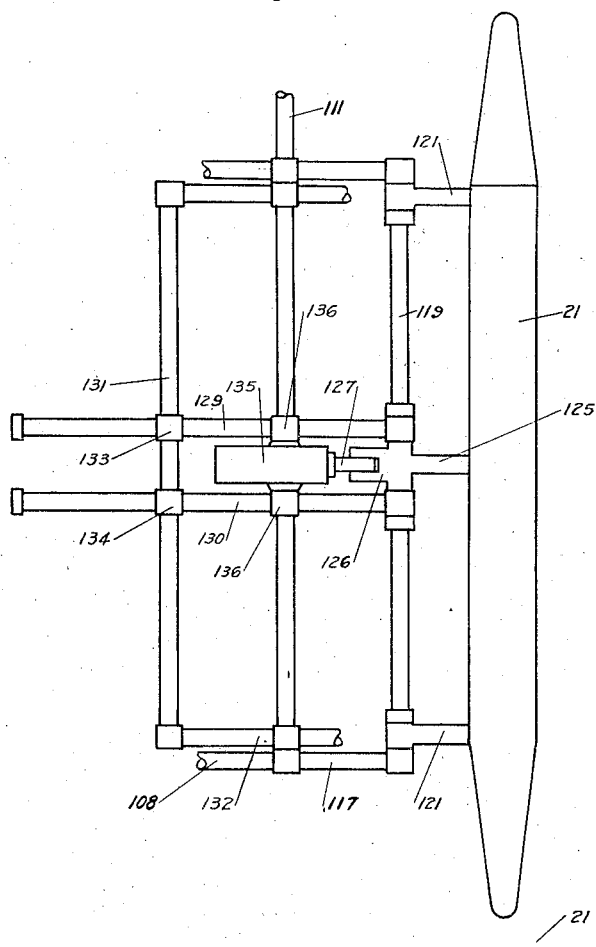
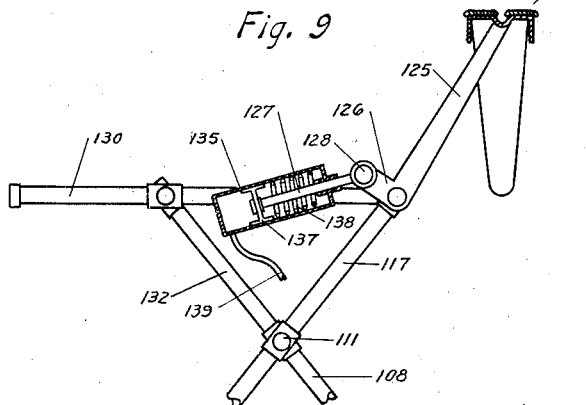

Oct. 27, 1931.   A. M. ROSSMAN   1,828,949
ELECTRIC TRACTION
Filed May 27, 1929   13 Sheets-Sheet 8
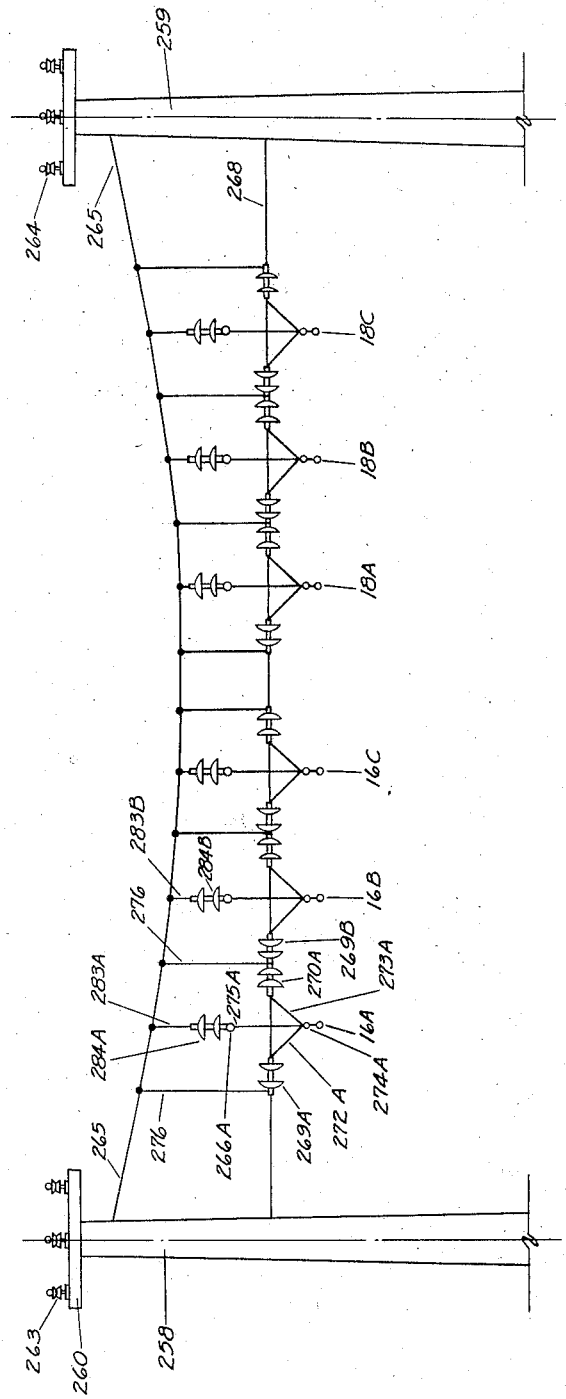

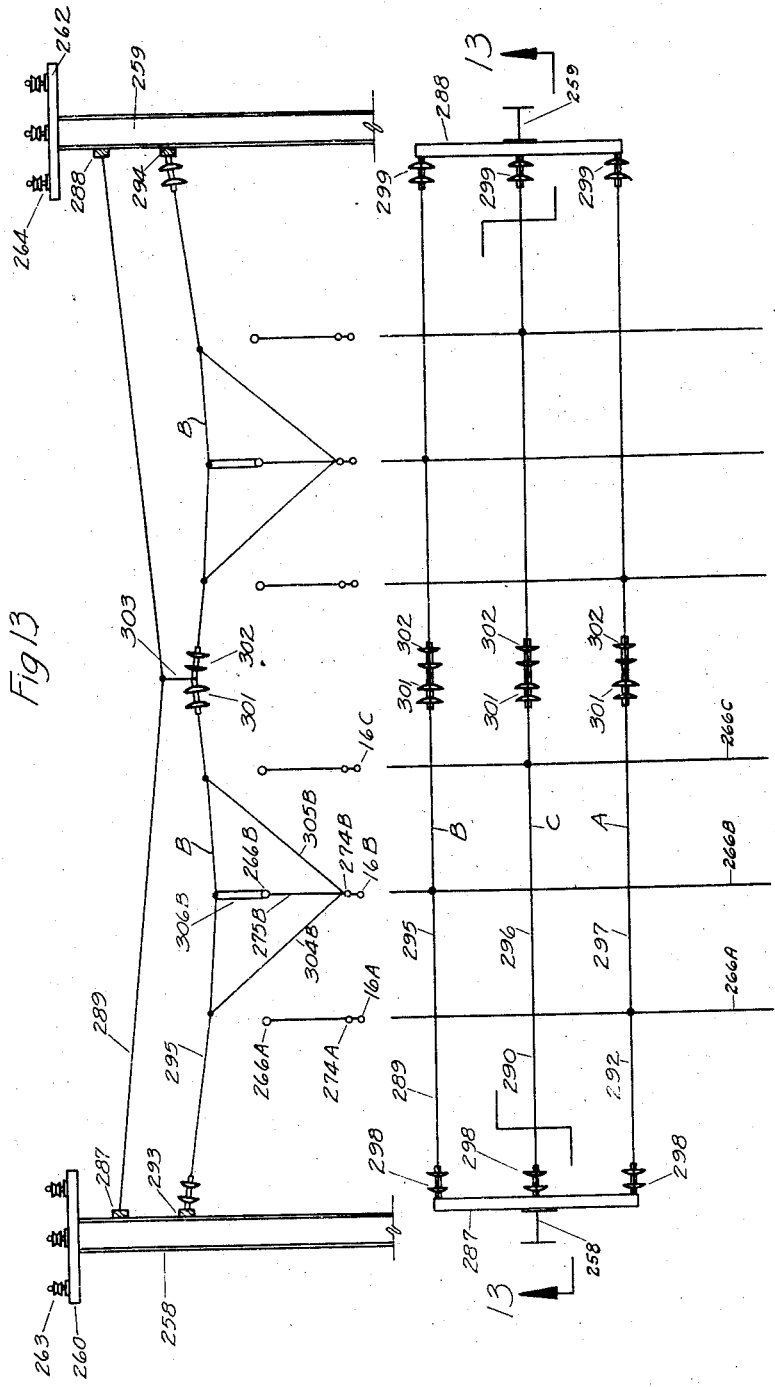

Oct. 27, 1931.　　　A. M. ROSSMAN　　　1,828,949
ELECTRIC TRACTION
Filed May 27, 1929　　　13 Sheets-Sheet 10
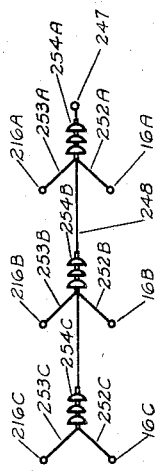
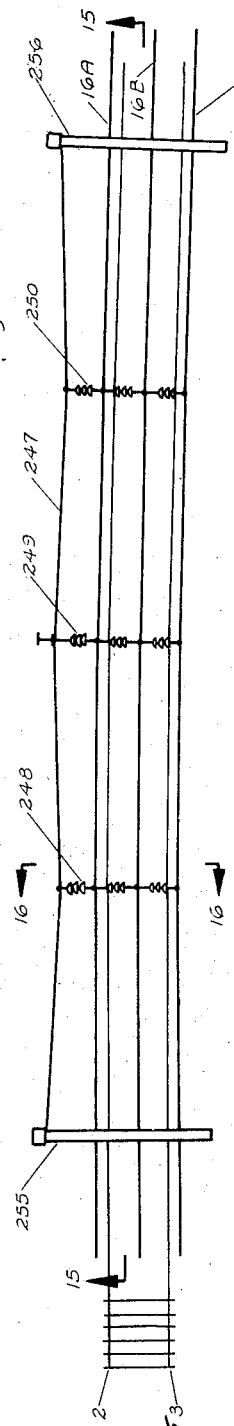
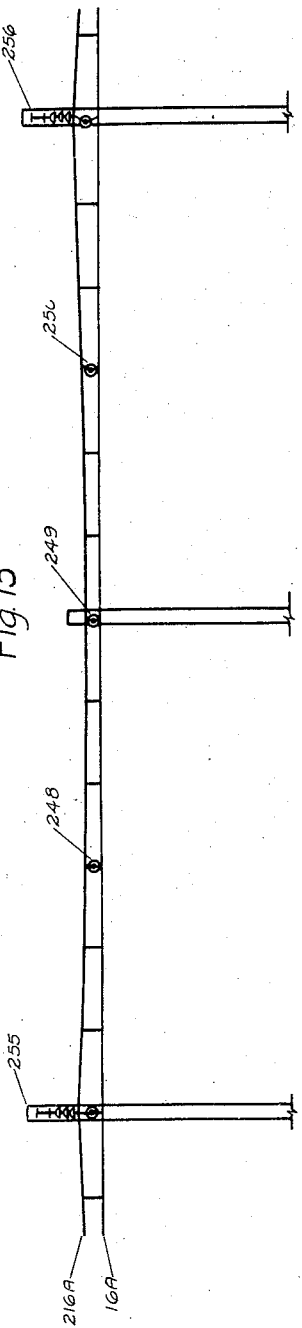
Inventor
Allen M. Rossman

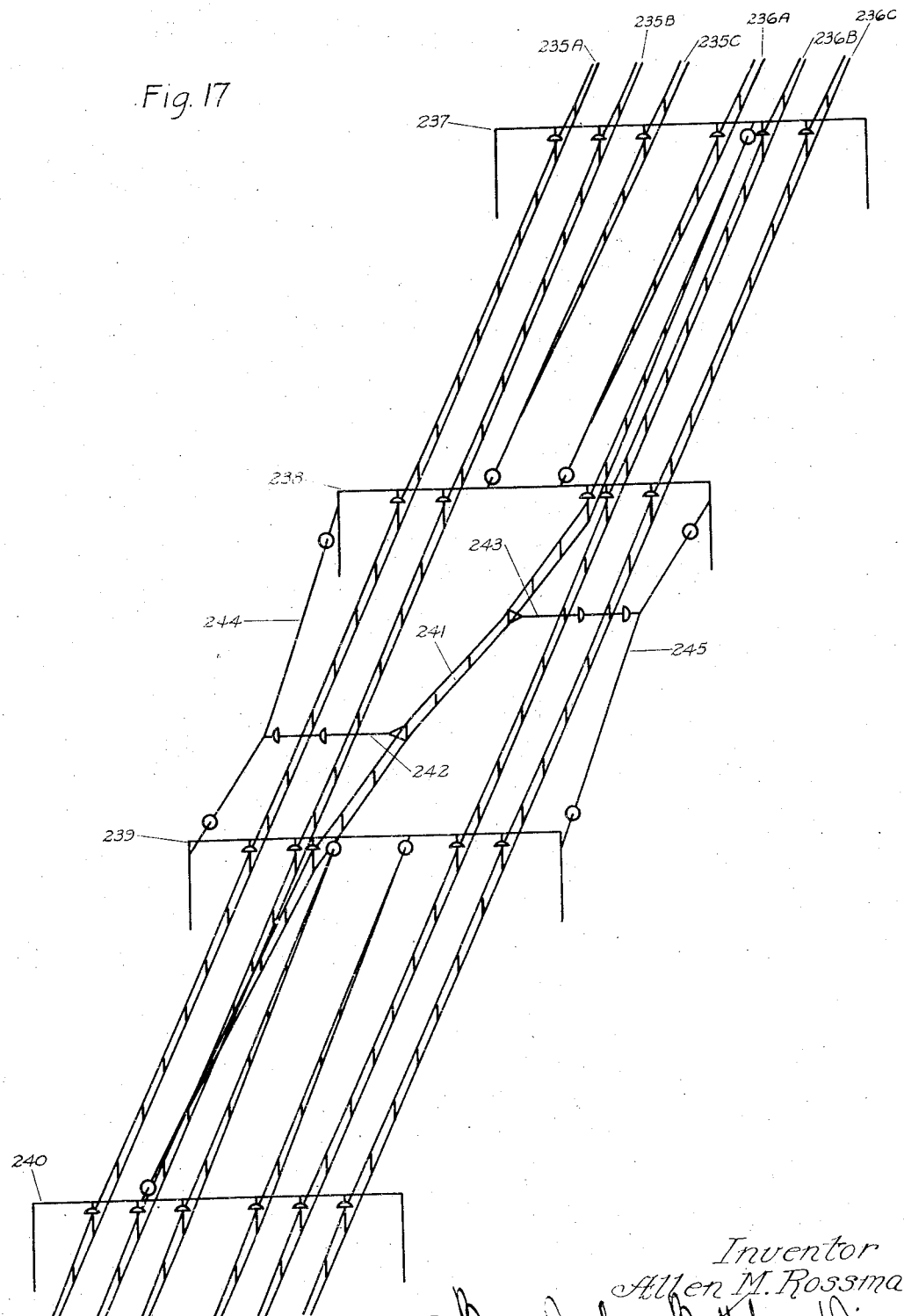

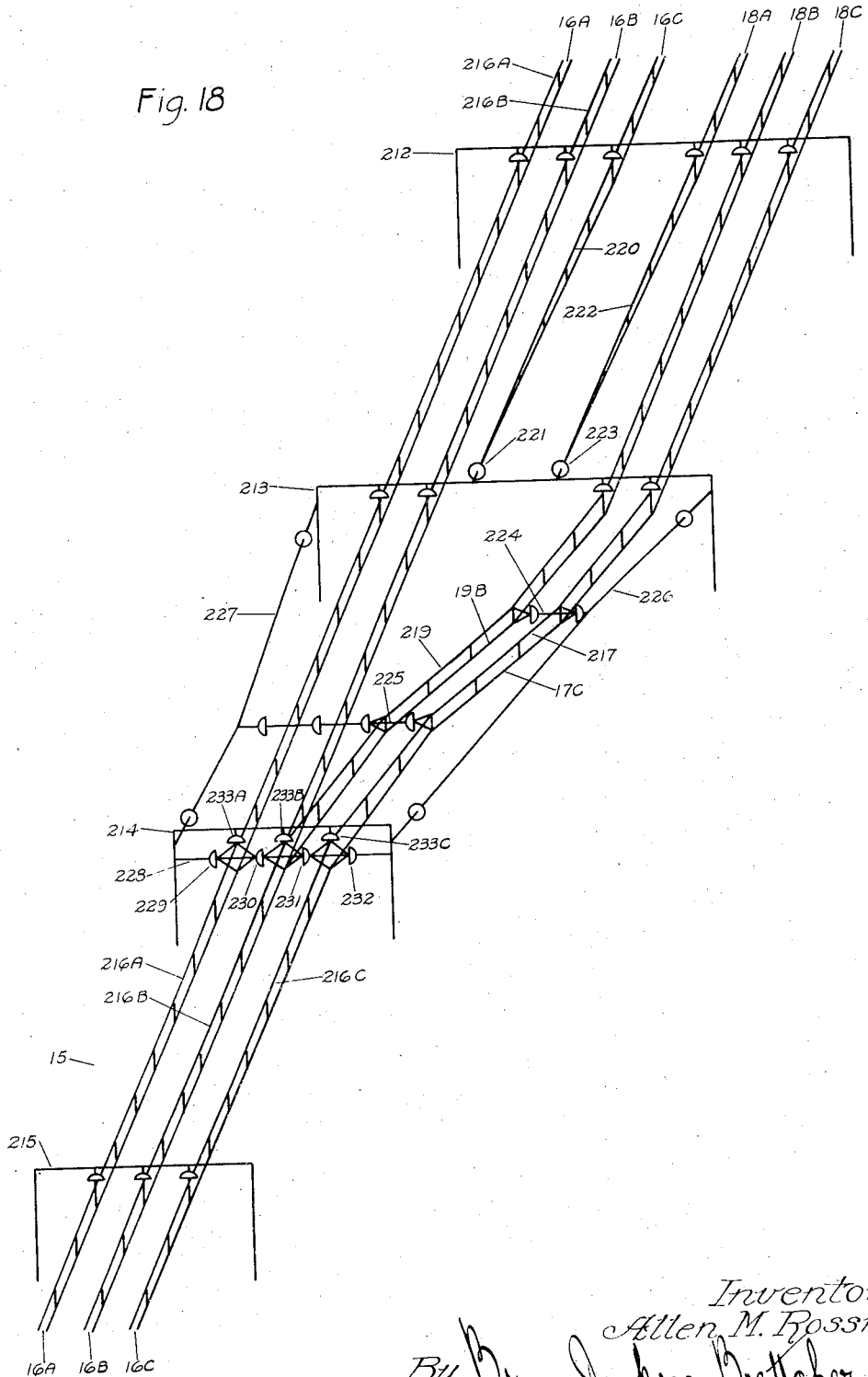

Oct. 27, 1931.  A. M. ROSSMAN  1,828,949
ELECTRIC TRACTION
Filed May 27, 1929  13 Sheets—Sheet 13

Inventor
Allen M. Rossman
By Brown, Jackson, Boettcher & Dienner
Attys.

Patented Oct. 27, 1931

1,828,949

UNITED STATES PATENT OFFICE

ALLEN M. ROSSMAN, OF WILMETTE, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

ELECTRIC TRACTION

Application filed May 27, 1929. Serial No. 366,231.

My invention relates to electric traction and is more particularly concerned with a traction system of the type disclosed in my copending application Serial No. 357,538, filed April 23, 1929, employing three phase alternating current on the trolley.

The present invention is more particularly concerned with the problem of current collection from a three phase trolley and the problem of current supply at intersecting trolleys, as at crossovers, turnouts, etc.

In the preferred form of the present invention, the trolley wires of all three phases are suspended or otherwise supported upon substantially the same level, i. e., at the same height above the track rails. Hence, at crossovers from one track to another track, turnouts and track crossings, in fact all forms of track intersection, the trolley wires of the three phases would, if all were continued throughout, lead to difficulties by intersections.

Any close approach of different phases is highly inadvisable, because of the relatively high voltage (13,200 volts) which is preferably employed.

Now, whereas in my prior construction, I employed trolley wires on different levels and utilized only a single trolley wire of one phase with neutral track return for all forms of track intersections and carried the other phases above the level of the normally higher central trolley wire. I have, according to the present invention, devised a system of current collection which permits the discontinuance of only one trolley wire at a turnout and, hence, operation upon full single phase with the two metallic conductors, i. e., two trolley wires supplying the full voltages between two phase wires of the current supply system. This obviates the grounded or track return, which necessitates the carrying of a neutral conductor sometimes quite a distance. A further advantage is the reduction in electromagnetic disturbance and an increase in power available at the motors.

The three trolley wires are spaced three to four feet apart. All three wires are suspended at the same elevation. For high speed service, each wire is suspended from a catenary messenger.

At a turnout the outer wire is carried through on the main track, the middle wire branches, and the inner wire is carried into the turnout. This construction provides two wires over each track.

At a crossover to another track, the outer wire is carried through on the main tracks, the middle wire branches, and the inner wire is discontinued. This gives two wires over the main tracks and one wire over the turnout.

At switching yards, the middle wire alone is utilized.

In conjunction with this system of trolley conductors, I have provided a novel form of current collector, shown in this case as a pantograph collector. In this construction, the pans or shoes for the three phases are mounted on a common extensible and collapsible frame, but on this frame the three pans or shoes have independent motion. Lateral swaying of the body of the locomotive would, if the pantograph were mounted solidly on the body, cause the pantograph to have so much lateral play as to cause serious difficulty in maintaining separation of the phases. By the use of the compensating device disclosed in my copending application, Serial No. 357,538, filed April 23, 1929, this difficulty is avoided by moving the pantograph with respect to the body.

Particularly the outer pans or shoes are mounted for individual lowering and raising to avoid fouling the other phases at a track intersection. At a track crossing or crossover, both outer pans are lowered for clearing the single central phase conductor or trolley wire, which runs through the crossing or crossover for each track.

I have also provided novel means for controlling the pressure of the collapsible frame or pantograph for regulating the pressure of the same to avoid overloading two pans or a single pan, when one or two pans are lowered. This preferably is done by means operated in conjunction with the individual pan lowering and/or raising means.

I provide also a novel control mechanism at or in conjunction with the track for automatically and selectively lowering the proper pan or shoe upon approaching a crossover or turnout, or the like. This control mechanism may be employed for all track intersections or special conditions where automatic control of the collector shoes or pans is desired.

The pantograph is raised by springs, the pressures of which are adjusted to give the proper pressures to the three collectors against their respective trolley wires. It is also equipped with three air cylinders each designed to neutralize the pressure of one collector against its trolley wire. When the locomotive enters a single phase zone and the switching change is made from three phase three wire to single phase two wire, air pressure is automatically applied to one of the cylinders to relieve the pressure of the open circuited collector against its trolley wire. If the operation is changed to single phase with one trolley wire, then air pressure is applied to both outer cylinders. To lower the pantograph, air pressure is applied to all those cylinders.

This assures a constant pressure at all times of each collector against its trolley wire, whether the locomotive be collecting current from one, two or three wires.

At the top of the pantograph, the collector of each phase is spring mounted on its own independent support. The spring of each collector is adjusted to give it the proper pressure against its trolley wire. To neutralize the spring pressure, each of the two outer collectors is equipped with a small auxiliary air cylinder. Each auxiliary cylinder is connected by a flexible metallic hose running through the hollow tubes of the framework in multiple with the larger air cylinder located directly below it at the base of the pantograph. As the locomotive enters the single phase zone and air pressure is applied to the main cylinder, it is simultaneously applied to the auxiliary cylinder. The air pressure then overcomes the spring pressure and lowers the collector so that it will clear the trolley wire of the adjacent phase that crosses its normal path.

Cooperating with the above is a changeover relay for shifting the transformer connections to single phase, so that the locomotive may be operated upon single phase current, where one or both outer pans are lowered. Where one pan only is lowered, the current is single phase between two phase conductors, and when both pans are lowered the current is single phase to neutral.

The transformer connections are changed only for one wire to ground operation and the transformer coils are connected in multiple delta with one terminal grounded to the locomotive frame.

To effect the switching change from three phase to single phase and vice versa, use is made of the principle of magnetic induction. To select the proper connections, advantage is taken of the displacement of the phases of a three phase circuit. These operations are accomplished in the following manner.

One or more of the locomotive axles carries a secondary coil. This is connected to the movable winding of a directional relay, which operates on the principle of the synchronoscope. The stationary winding is continuously excited from the middle phase voltage. Where a change in circuit connections is desired, a pair of the main traction rails are tied together by a magnetic yoke, which carries two coils. One coil is connected to each of the outer phases of a three phase transformer energized from the trolley system. By means of circuit selector switches interlocked with the track switch operating stand, one or the other coil is connected to the transformer.

As the locomotive passes over these rails, the magnetic circuit is completed through the wheels and axle, the axle coil is energized and its current passes through the relay coil. The relay then registers 120° or 240° displacement depending on which of the two coils is energized, and thereby sets the control circuit to open the proper oil circuit breaker and drop the corresponding pantograph collector. If both coils are energized, the relay registers 180° displacement. Then both outer phase circuits open, and both outer collectors drop.

As the locomotive passes out of the single phase zone, it first completes the magnetic circuit on the same phase setting on which it it then operating. There is, therefore, no change in connections. Just beyond it is a second pair of rails excited from the middle phase wire. As the locomotive passes over them, the relay registers in phase with its exciting coil and connections are re-established for normal three phase operation. This scheme of control does not require that any electrical contacts be made between the moving locomotive and the stationary parts of the control system.

The novel track relay and control mechanism may be employed for other purposes independently of the current collector control, as for signaling or other control purposes. Likewise, the relation may be reversed, i. e., by imposing current of selected phase upon the locomotive coil and connecting the track coil to a responsive relay for signaling from the locomotive to a station along the track.

If set for a crossover to an adjacent track, the main transformer primary windings are reconnected from series to multiple to receive a reduced impressed voltage and, at the same time, maintain normal or slightly higher than normal impressed voltage on the motors. Contact is then established with the track for the phase to neutral connections.

This occurs at the same time that both outer phases are opened and both outer collectors are lowered. A three phase auto transformer is connected to the rails to return the ground current to the trolley system near the point where it originates.

On the single phase connection, the motors develop about ⅔ of the horse-power that they develop as normal three phase motors.

As the D. C. motors idle the A. C. motors from one operating speed to another, the usual difficulty of starting a single phase motor under load is eliminated.

A further feature of novelty of the present invention is a novel form of trolley suspension for three phase three wire trolley or two wire three phase or single phase trolley. Different embodiments of this phase of the invention are herein disclosed. It is highly desirable to avoid as much as possible side sway of the trolley conductors and/or messenger cables and connected parts, and this my present construction provides.

On curves the conventional suspension is undesirable because of the tendency to lateral motion of the trolley and messenger upon engagement with the current collector. When three trolley conductors of different phase are employed, such lateral motion becomes particularly undesirable and my invention provides a suspension which avoids the same.

A further feature of novelty herein disclosed is a motor mounting suitable for multi-unit drive such as may employ a plurality of small units, instead of large units for locomotive drive. For locomotive drive where the motor units become relatively heavy and bulky, I prefer to mount the motor units above the springs and connect to one or more of the driving axles through a flexible driving connection in any of the ways now known to the art as, for example, through the driving quill or the crank and connecting rods or double crank and connecting rods, all of known construction. In my construction, the drive of the two motors is, in each case, transmitted through the differential gear or other differential connection mounted above the springs and from thence through suitable flexible drive connection to the locomotive drive axles.

In such constructions, the differential cage of the planetary drive or final element of any other differential connection is connected to one or more drivers through a connection of sufficient flexibility to allow the motors and differential gear to be disposed above the springs of the truck.

Now in order to acquaint those skilled in the art with the manner of constructing and operating a device embodying my invention I shall describe in connection with the accompanying drawings a specific embodiment of the invention.

In the drawings:

Figure 2 is a diagram of a part of the locomotive circuit more particularly concerned with the pantograph control and changeover control from three phase to phase to neutral, and vice versa, of the transformer connections;

Figure 3 is an end view of the pantograph collector showing its engagement with the trolley wires;

Figure 4 is a side view of the pantograph collector;

Figure 5 is a side view of one of the outer collectors;

Figure 6 is a similar view of the middle collector;

Figure 8 is a plan view on an enlarged scale of one of the outer collectors and its mounting;

Figure 9 is a vertical section of the same;

Figure 11 is a similar cross sectional view of a modified form of mounting of the trolley wires;

Figure 12 is a plan view;

Figure 13 is a cross sectional view on the line 13—13 of Figure 12 of another form of trolley suspension;

Figure 14 is a plan view of trolley and track on a curve showing the method of holding the trolley in the curved position;

Figure 15 is a vertical sectional view taken on the line 15—15;

Figure 16 is a cross sectional view taken on the line 16—16;

Figure 17 is an isometric view of a crossover between two tracks;

Figure 18 is a similar view of a turnout of a trolley from one track to another;

Figure 1:
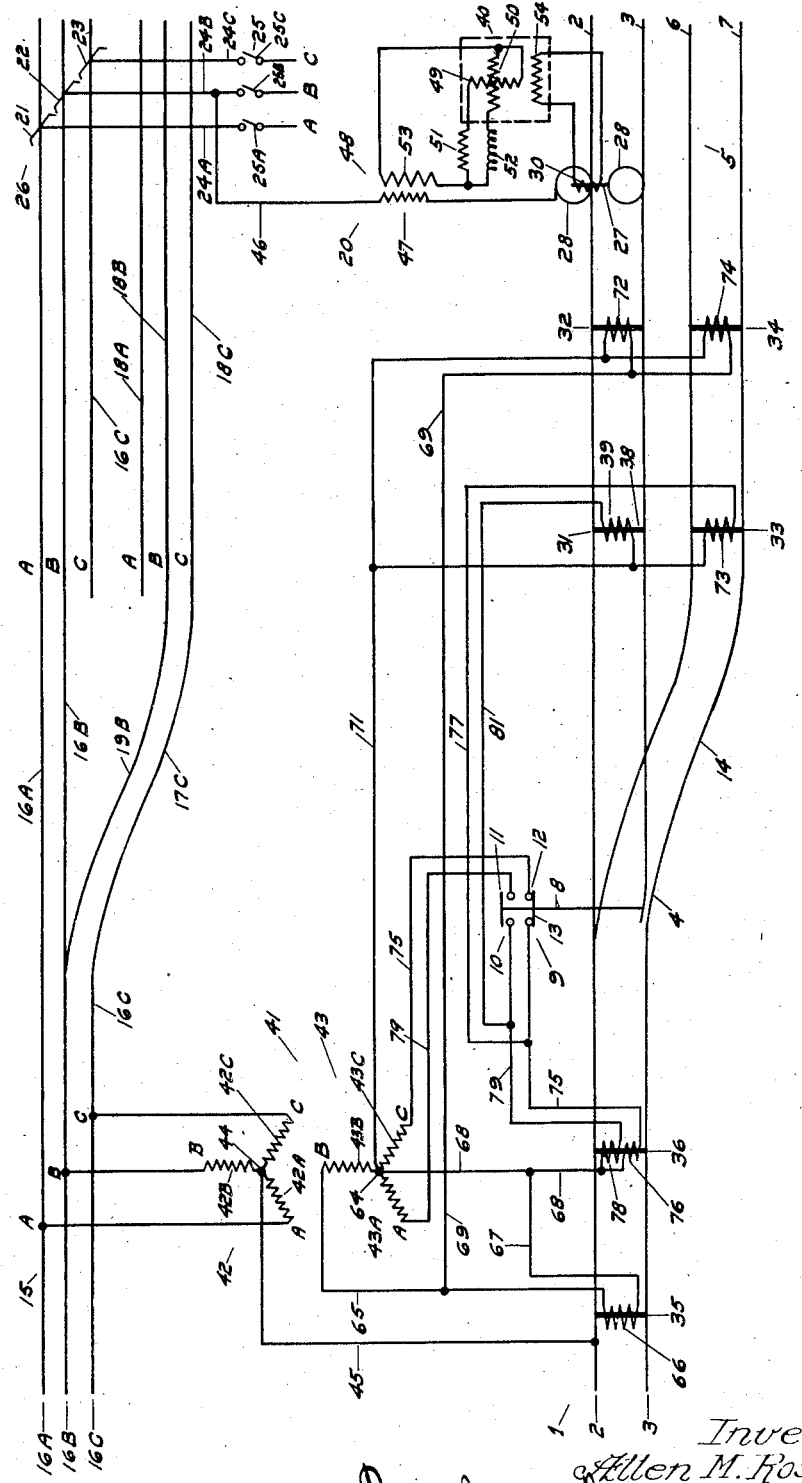
Figure 1 is a diagram of the track and trolley indicating the track circuit and the locomotive relay controlled by the track circuit.
Figure 7:
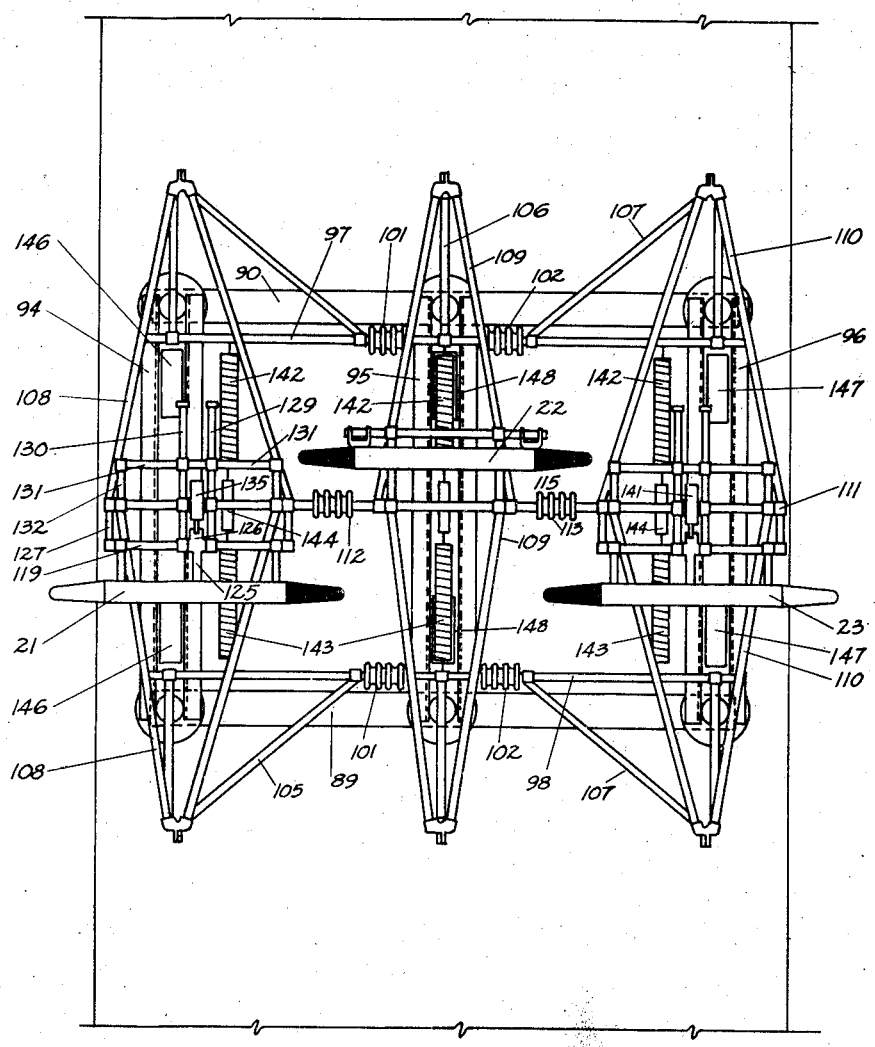
Figure 7 is a plan view of the pantograph collector.

Referring, first, to Figure 1, the track 1 comprising the rails 2 and 3 is connected through a turnout switch 4 to the side track 5 having the rails 6 and 7. The switch 4 may be of the usual split type, or of any known or preferred type, the operating mechanism for which is connected by a suitable link 8 to a selector switch 9. This selector switch has a pair of contacts 10 adapted to be closed by the contactor 11 when the link 8 is thrown downwardly to set the switch 4 for through operation on the main line 1, and it has a pair of contacts 12 adapted to be closed by the contactor 13 when the link 8 is thrown upwardly as viewed in Figure 1, to connect the main line track 1 to the left of the switch with the siding or side track 5.

The trolley 15 comprises three main trolley conductors 16A, 16B and 16C. The Letters A, B, C refer to the phase of the conductors. The trolley conductors 16 are suitably connected to a source of three phase alternating current preferably 60 cycles or of any commercial or preferred frequency.

The trolley conductors 16A and 16B are continuous throughout over the main line track 1. The outer trolley wire 16C curves outwardly following the curved rail 14 of the switch leading to the side track 5, as indicated at 17C, and this continues as straight trolley wire 18C over the side track 5. A branch trolley conductor 19B branching off from the central trolley wire 16B and extending over the curved rail 14 of the side track 5 is then continued on over the rest of the side track as a straight trolley wire 18B. The inner, or third, trolley wire 18A continues over the straight portion of the side track 5 and likewise the trolley wire 16C of the main line track is then continued again with the wires 16A and 16B throughout the rest of the main line track 1.

The locomotive is indicated diagrammatically at 20. It has a current collector comprising the pans or shoes 21, 22 and 23 which, as indicated in Figure 1, are connected to suitable leads 24A, 24B and 24C extending through the main switch 25 and through suitable intermediate connections, later to be described in detail, to the main transformer.

The pans or shoes 21, 22 and 23 are electrically insulated from each other but are mounted upon a common pantograph structure as will be described later.

It will be apparent that the three trolley conductors which lie, preferably, in the same plane cannot all be extended through the turnout arrangement but the branching of the middle trolley and the continuation of the outer trolley may be carried from main line onto or over the side track. Likewise it will be apparent that the current collector 26 cannot be run across the branching or outwardly curved trolley wires with all of the shoes or pans raised without danger of fouling or of causing interphase connections or short circuits which would be highly undesirable. I have provided, therefore, means for lowering either or both outer trolley shoes 21 and 23. Assume that the locomotive is in the position shown with an axle 27 bearing the wheels 28, 28 running on the main line track to right of the track switch 4 and moving towards the left. It will be apparent that as the collector 26 approaches the region of the track switch 4 and the branched trolley connections that if the outer collector 23 were lowered the two collector pans 21 and 22 could proceed on through to the left of the track switch 4 without fouling any of the trolley connections or causing phase interconnections.

Likewise, if the locomotive 20 were at the extreme left of Figure 1 proceeding on the main line track to the right with the track switch set for main line track operation only, the trolley could properly proceed throughout the region of the track switch 4 by merely lowering the collector pan 23 and again raising the same when the region of the track switch 4 were passed.

If the locomotive 20 were at the left of Figure 1 and the track switch 4 were in the position shown to shunt the locomotive to the side track 5, it will be apparent that the collector 26 could proceed through the region of the track switch 4 without interference if the collector pan 21 were lowered and after the region of the track intersection is passed the collector pan 21 might again be raised for three phase operation.

The locomotive preferably employed in connection herewith is of the three phase-single phase type disclosed in my copending application, Serial No. 360,400, filed May 4, 1929, the connections of which are shown more particularly in my copending application Serial No. 365,832, filed May 25, 1929. That is to say, the locomotive can operate either on full three phase 60 cycle alternating current or upon any other frequency of alternating current, or it can operate on phase to neutral alternating current or upon single phase current between two of the phase conductors of a three phase system.

When the locomotive operates on current supplied by two phase conductors, that is, the two phase conductors of a three phase system, no change of the transformer connections is necessary. When the locomotive operates on a single trolley wire between one phase of a three phase system and neutral, preferably the transformer connections are shifted automatically to establish the neutral connection and to connect the transformer windings in parallel on the primary side of the transformer for energizing all of the windings thereof.

In conjunction with the layout shown in Figure 1, I have shown automatic means for effecting the shifting of the position of the collector pans or shoes to prevent interference as the locomotive passes through the region of the track switch.

While I have shown only one special case the same mode of control may be applied to all situations as will be apparent from the detailed description of the operation of this special case.

The locomotive axle 27 is provided with a coil 30 embracing the same, that is, in inductive relation to the flux passing through the axle 27 and control magnets such as 31, 32, 33, 34, 35 and 36, are disposed in magnetic relation to the track at suitable points for cooperation with the axle 27 and its coil 30. For example, the control magnet 31 comprises a magnetic core member 38 having thereupon a winding 39 by which said core member is adapted to be energized by alternating current of a particular phase.

The core 38 extends between the track rails and is connected in magnetic contact with the same. Now it can be seen that as the locomotive passes over the region of the controlling magnet 31 the wheels 28 and axle 27 form a magnetic bridge between the rails 2 and 3 providing a closed magnetic circuit in which the winding 39 energized by a particular phase of the three phase system will induce a corresponding phase voltage in the coil 30.

The locomotive is provided with a phase sensitive relay 40 and it governs controlling circuits for effecting the proper raising and lowering of the collector pans.

The track magnets are suitably controlled by the selector switch 9 which is operated in conjunction with the track switch 4, as previously explained. A three phase transformer 41 having the primary windings 42A, 42B and 42C is connected to the trolley conductors 16. The secondary windings 43A, 43B and 43C are adapted to be connected to the proper control magnets for causing through the phase sensitive relay 40 the proper action of the collector pans.

The neutral point 44 of the primary windings of the transformer 41 is connected through a lead 45 to the track rails 2, 3. The central collector pan 22 which always remains in contact with its trolley wire 16B is connected through a lead 46 at primary winding 47 of transformer 48 to the locomotive frame and axles including the axle 27 and wheels 28 whereby sufficient single phase current, that is current of the B phase to neutral traverses the winding 47 of transformer 48 to energize the power and reactive coils 49 and 50, respectively, of the phase sensitive relay 40.

The coil 49 is connected to the secondary terminals of the transformer 48 through resistance 51 and the reactive coil 50 is likewise connected to the secondary winding 53 through the inductance 52. These coils 49 and 50 are placed substantially at right angles to each other in the well known manner of a power factor meter. The magnetizing coil 54 is energized by the action of the track magnets 31 to 36, inclusive. This relay 40 comprises a movable magnetic vane 55 (see Figure 2) suitably pivoted to be rotated into a definite position under the influence of the rotating field produced by the windings 49 and 50 and the relatively stationary field produced by the windings 54.

Obviously, the windings 49 and 50 through their appropriate resistance and inductance 51 and 52, respectively, might be connected to the axle coil 30 instead of the coil 53. In that case the magnetizing winding 54 would then be connected to the transformer winding 53.

The rotatable vane member 55 bears a series of contacts 56, 57, 58, in suitable angular position for making individual contact with the stationary contacts 61, 62 and 63, respectively, and also it bears a double contact 59 for engaging both contacts 61 and 62 and supplying positive potential to them.

The track magnets 35, 32 and 34 are all connected in multiple to the secondary coil 43B, being thus energized from B phase to neutral of the trolley.

The connections are as follows: From the outer terminal of coil 43B the lead 65 extends directly to the winding 66 of the magnet 35 the remote terminal of which leads through conductor 67 to the common neutral connection 64 over the wire 68.

A branch 69 from the wire 65 leads in parallel to the windings 72 and 74 of the magnets 32 and 34, their remote terminals being connected to the neutral point 64 over the common return 71. These track magnets 32, 34 and 35 are, therefore, always energized by B phase current and their effect upon the track relay is to insure that it will be in the position shown in Figure 2, that is, with the bridging contact 59 across the contacts 61 and 62 holding the circuit breakers 25A and 25B in closed position and maintaining the collector pans 23 and 21 in raised position for straight three phase operation. These control magnets are placed just in advance of the magnets such as 31, 33 and 36 to insure that upon leaving the zone of single phase operation three phase operation will be restored.

The controlling magnets 31, 33 and 36 are selectively energized by the selector switch 9. Consider the locomotive 20 as on main line track over the control magnet 36 and advancing towards the right. With the track switch 4 as shown to shunt the locomotive to the side track 5 the selector switch has bridged the contacts 12 thereby connecting the coil 43C of the transformer 41 over the lead 75 through the switch contact 12 to the terminal of the coil 76 of the magnet 36.

The remote terminal of the coil 76 is connected to the neutral point 64 over the return wire 68. A branch wire 77 is connected to the wire 75 beyond the switch 12 and it leads to the terminal of the coil 73 of magnet 33. The remote terminal of the coil 73 is connected to a branch of the common return wire 71 leading to the neutral point 64 of the transformer winding. Thus in the position shown, the magnet 36 and the magnet 33 are energized by C phase current. The effect of this phase operating through the phase sensitive relay 40 is to open the main switch 25A and lower the inner pan 21 of the collector 26 so that the two pans 22 and 23 may remain in contact with the B and C phases running from either main track to the siding or from the siding to the main track. The effect of C phase upon the phase sensitive relay 40 is to rotate the contact 56, connected to the movable vane 55, into engagement with the stationary contact 61 for holding the switch 25C closed. Since the circuit of the stationary contact 62 is thereby opened the main switch 25A will be opened and the pan 21 will be lowered.

If the track switch 4 were thrown to the opposite position, that is, for making the main line track continuous by closing said switch 4 the link 8 would be moved downwardly, as viewed in Figure 1, closing the contact 10. This puts A phase current upon the coil 78 of the magnet 36 and upon the coil 39 of the magnet 31.

The circuit for this is established over the wire 79 which leads from the outer terminal of the coil 43A of the transformer 41 through the switch contact 10 to the terminal of the winding 78 of the magnet 36 and from thence over the common return 68 to the neutral point 64 of the secondary winding 43 of the transformer 41. A branch wire 81 leads to the coil 39 of magnet 31 and from the remote terminal of said coil back to the neutral point 64 over the common return 71.

The effect of A phase current upon the magnets 36 and 31 when imposed upon the phase sensitive relay 40 is to rotate the vane 55 so as to bring the movable contact 57 into engagement with the stationary contact 62 and hold the switch 25A closed and permitting the switch 25C to open and the pan 23 to be lowered.

It is to be understood that the rotor of the relay 40 will stand in any position to which it has been moved until other influence is brought to bear to bring it to another position.

After the locomotive passes out of the region of the switch 4 it must, in each case, pass one of the relays 32, 34 or 35 and in so doing is brought back to the position shown in Figure 2 with both switches 25A and 25B in closed position and the pans 21 and 23 in raised position.

*Pantograph operation*

By reference to Figure 2, which illustrates a portion of the locomotive diagram shown in full in my copending application Serial No. 365,832, filed May 25, 1929, the particular pantograph control and changeover from three phase to single phase to neutral, and vice versa, shown in present Figure 2 may be substituted for the corresponding parts in the disclosure of Serial No. 365,832, filed May 25, 1929. In said prior case I have shown a track contact as controlling the pantograph and changeover relay whereas in the present construction I show the control magnets and phase sensitive relay. The current collector 26 comprises a pantograph structure illustrated more in detail in Figures 3 to 9, inclusive. The locomotive 20 has a body member 83 mounted upon springs on axles like the axle 27, said axles having wheels running on the track. A shiftable base frame 84 is mounted on the curved roof of the body 83, the curvature of this roof being on a radius which has its center substantially at the center of sway of the body 83 and by a compensating mechanism, not here shown but specifically described and claimed in my copending application, Serial No. 357,538, filed April 23, 1929, the base frame 84 is shifted on the body 83 so as to maintain the pans 21, 22 and 23 definitely in alignment with the track rails. The trolley conductors 16A, 16B and 16C are carefully aligned with the track rails by means which will be described more in detail later, and by the effect of the compensating mechanism these pans are kept in alignment with the track and, hence, in alignment with the trolley conductors.

The collector 26 comprises a pantograph frame 85 having three main pantograph members 86, 87 and 88 electrically insulated from each other but mechanically joined for common operation. The base frame 84 comprises a pair of transverse members 89 and 90 each mounting three insulators 91, 92 and 93, the tops of which are provided with metallic caps and connected by pairs of angle irons 94, 95 and 96. The cross members 89 and 90 may be joined by additional longitudinal members connecting the bases of said insulators together. Above the insulators insulation between the phases is carefully preserved.

A pair of transverse rocking shafts 97 and 98 are mounted upon said longitudinal angle bars 94, 95 and 96, and these shafts 97 and 98 are broken into three separate sections devoted to the three phases by means of the interposed insulators 101, 102.

The lower arms 105, 106 and 107 at each end are pivotally mounted on said rods 97 and 98. Upper arms 108, 109 and 110 are hinged to the lower arms 105, 106 and 107 and at their upper ends are pivoted on the transverse rod 111 which in turn is broken electrically into three separate sections by the insulators 112 and 113.

The central rear arm 109 projects beyond the pivot rod 111 and has hinged to its upper end at 114 the short arm 116 which bears the pan 22. The pans 21, 22 and 23 have extensions of insulation curving downwardly and at their upper ends being flush with the faces of said pans.

The two outer front arms 108 and 110 have extensions 117 and 118 running past the pivot rod 111. The extension 117 has a hinge rod or pin 119 upon which the pan 21 is mounted by the short arms 121. In like manner, the extension 118 has a hinge or pivot pin 122 bearing the short arms 123 and supporting the pan 23.

The hinge rod 119 is fixed to the arms 121, 121 and likewise a central supporting arm 125 (see particularly Figures 8 and 9) has a crank arm 126 to which there is hinged the piston rod 127 by a wrist pin 128.

A pair of guide rods 129 and 130 hinged to the hinge pin 119 extend over the rod 131 which is connected to the extension 132 of the rear upper link 108, these rods 129 and 130 being guided for sliding motion in the boxes or guides 133 and 134 mounted upon said rod 131.

The cylinder 135 is mounted on trunnions 136, 136 the bearings therefor being connected to the slide rods 129 and 130. The cylinder 135 has a piston therein 137 normally thrust inwardly by the spring 138. The cylinder has a flexible air hose connection 139 by which compressed air may be admitted to force the piston 137 to the right, as viewed in Figure 9, for lowering the pan 21. If the pan 21 should be swung to the left over center at the time that air pressure is applied then the arm 125 instead of being swung in a clockwise direction, as viewed in Figure 9, will be swung in a counter clockwise direction, as viewed in Figure 9, and in either case the pan 21 will be lowered.

The construction and mounting of the pan 23 is the same as that described in connection with the pan 21 and a suitable air hose 140 is provided for its cylinder 141.

Tension springs 142 and 143 are connected at their inner ends to a bracket 144 for each phase of the current collector and the outer ends of these springs are connected to the lower arms, such as 105, as shown in Figure 4, for extending or raising the pantograph collector. Thus there are three sets of springs, one for each phase, each set of springs being designed to apply the proper raising pressure for securing the proper engagement between the corresponding pan and its trolley wire. That is to say, each set of springs is sufficient to apply the proper pressure of the pan to the trolley wire for its corresponding pan. Hence, it is to be observed that if one or both of the outer pans are to be lowered the spring pressure would then all be thrown on the central pan and would be excessive. In order to obviate this I provide for each of the two outer phases the air cylinders 146 and 147 arranged in pairs and adapted and designed to provide a neutralizing force for the springs such as 142 and 143.

The central phase is likewise provided with an air cylinder 148 and it is designed to supply sufficient force in conjunction with the forces applied by the cylinders 146 and 147 for lowering the entire pantograph collector. The air cylinder 146 is controlled by a magnet valve 150. Likewise, the air cylinders 147 are controlled by magnet valve 151 and the lowering cylinder 148 is controlled by magnet valve 152.

The pantograph is preferably latched down by an automatic latch which catches the same and holds the pantograph in lowered position, this catch being released by an air cylinder (not shown) operated by a magnet valve, the magnet of which is indicated at 153. Any suitable means may be operated by the winding 153, Fig. 2, to permit the pantograph to be raised. Preferably there are two pantographs disposed upon each locomotive, as shown in my copending application Serial No. 365,832, filed May 25, 1929, and either may be employed, or both may be employed, as may be desired. The magnet valves 150 and 151 are selectively controllable by the phase sensitive relay 40 through auxiliary switches 155A and 155C operated in conjunction with the main switches 25A and 25C. Likewise, the magnet valve 152 is controlled in conjunction with the main switch 25B through an auxiliary switch 155B.

A suitable reservoir of compressed air 156 is manifolded to the magnet valves 150, 151 and 152. The valve 150 has a coil 157 adapted to shift the valve from normally closed position, as shown in Figure 2, to open position. This valve comprises an admission port 158 and an exhaust port 159 controlled by suitable valve members mounted upon a common stem and between these ports the connection 160 leads off to the cylinders 146 at the base of the pantograph and through the flexible hose 139 to the auxiliary cylinder 135 for lowering the pan 21, as previously explained. Thus when the main switch 25A is closed, the auxiliary switch 155A is open and the coil 157 of the magnet valve 150 is deenergized. The admission port 158 is, therefore, closed and the exhaust port 159 is open with the result that the springs 142 and 143 for the corresponding pantograph section and the spring 138 for the pantograph pan 21 are put in control of the pan 21 causing the same to remain in contact with its trolley wire 16A. When the switch 25A is opened, the auxiliary switch 155A is closed and the coil 157 of the magnet valve 150 is energized closing the exhaust port and opening the admission port, thereby admitting compressed air to the cylinders 146 and 135 in parallel. The cylinder 135 lowers the pantograph arm 125 bearing the pan 21. The cylinder 146 counterbalances the pressure of the springs 142 and 143 to the desired extent thereby relieving the other pans of the pressure of these springs.

The operation of the magnet valve 151 and its cylinders 147 and 141 is as above described. The magnet valve 152 has a coil 159 controlled by the auxiliary switch 155B which is opened when the switch 25B is closed and closed when the switch 25B is open.

The operating magnets 161, 162 and 163 have a common return lead 164 which is cut through the contacts 165 of the magnet switch 166, this magnet switch having a coil 167. The return wire 164 is further cut through the contacts 168 of magnet switch 169 having the coil 170. When the contacts 168 of the magnet switch 169 are open the circuit breakers 25A, 25B and 25C are open and the pantograph is, therefore, disconnected from the transformer.

In the cab of the locomotive there is provided a bank of control switches 171, including the pantograph raising switch 172, the pantograph lowering switch 173 and the circuit breaker control switch 174.

To put the locomotive into commission the circuit breaker switch is snapped to closed position whereby current from the main positive supply wire 175 flows through the coil 170 over the wire 176 through the switch 174 and back over the return wire 177 to the negative supply wire 178. The coil 170 being energized closes the contact 168 and thereby prepares the common return wire 179 for the magnets 157, 158 and 159 of the magnet valves so that these magnet valves are then put under the control of the auxiliary switches 155A, 155B and 155C operating in conjunction with the circuit breakers corresponding thereto.

Assume that the pantograph had been latched down, the engineer closes the raising switch 172 long enough to energize the coil 153 and trip out the holding means whereupon the springs which operate upon the pantograph will raise the same. It will be observed that the coil 153 for raising the pantograph is connected to the common return 179 which in turn is cut through the circuit breaker control switch 168.

If it is desired to lower the pantograph, it is, of course, necessary to have the circuit breakers open otherwise an arc might be drawn at the collector pans which would be highly undesirable. The switch 173 when it is closed connects the wire 181 to the return wire 177 leading to the negative supply wire 178 thereby raising the contactor of the magnet switch 166 and opening the return wire 164 for the coils 161, 162 and 163 of the main circuit breaker. The circuit breakers 25A, 25B and 25C thereupon are opened. At the same time the switches 155A, 155B and 155C are closed and the coils 157, 158 and 159 of the magnet valves 150, 151 and 152 are energized admitting compressed air to the air cylinders for all three phases, whereupon the pantograph is collapsed and lowered.

The connections for the bank of switches 171 may be brought into the control cable for multiple operation. Such connections are indicated at 182. This is for the purpose of permitting control to be exercised from any one unit of a multi-unit drive.

The controlling magnets 161, 162 and 163 may be made slow acting. They may operate through magnet valves, if desired.

The phase sensitive relay has another function, namely, the function of switching the transformer connection to single phase to neutral, which has not been described in detail.

Where the single phase to neutral connections are to be made as, for example, in a crossing track or in crossovers, yards, and the like, the transformer connections must be switched and this may be done automatically under the control of the phase sensitive relay 40. The trolley wires are connected to a source of three phase current, such as that indicated at 185 in Figure 2, such source being provided with a grounded neutral connection, as indicated at 186.

The transformer connections, likewise, are provided with a ground connection 187. Instead of a straight grounded connection the neutral itself may be connected to the track and in that event the neutral conductor 186 is suitably connected to a section of the track which may be insulated from the remainder of the track, and the connection 187 may be made through the frame of the locomotive. In lieu thereof a third rail may be employed, or other connection made through the track, so as not to interfere with the phase sensitive relay 40.

In advance of a single phase region track magnets such as 35 and 36 are connected to the track rails, the relay 35 in that case insuring that the phase sensitive relay is in the position shown in Figure 2, and a magnet such as 36 provided with double windings energized from the A and C phases simultaneously causes the axle coil 30 to be energized by the resultant of the two phases A and C.

The resultant of the two phases A and C upon the phase sensitive relay 40 is to rotate the vane 55 to a position where the moving contact 58 engages the stationary contact 63. Positive control potential from the supply wire 175 is then supplied over the wire 188, contact 58, contact 63, wire 189, coil 190 of changeover relay 191 thereby closing the contact 192 and placing positive battery on the wire 194 and energizing the operating magnets 195, 196 and 197 of the switches 198, 199 and 200 for connecting the primary coils 201A, 202A in parallel, 201B, 202B in parallel, 201C and 202C in parallel in a delta connection between the B phase wire 203B and ground at 187. This puts the locomotive under approximately two-thirds full power operating as a single phase device. The transformer 204 has a secondary winding the coils of which are connected in a fixed star connection with the power leads 205A, 205B and 205C leading to the motor generator set and to the A. C. traction motor, as will be understood fully by reference to my copending application Serial No. 365,832, filed May 25, 1929.

The phase sensitive relay 40 will stand in the position referred to, namely, with the movable contact 58 standing on the stationary contact 63 and holding the changeover relay 191 in raised position so long as the locomotive is in a single phase zone.

Upon emerging from the single phase zone the axle 27 passes over a track magnet, such as 35, restoring the phase sensitive relay to the position shown in Figure 2. Obviously, if desired, an intermediate position employing two pans of the collector may be assumed but in either event as soon as the phase sensitive relay 40 is shifted to a position where the movable contact 58 leaves the stationary contact 63 the coil 190 of the relay 191 will be deenergized and the contacts 193 will be closed. Closing of the contacts 193 is accomplished only when the contacts 192 are opened and this results at once in energizing the switch operating magnets 206 and 207 over the wire 208, these magnets thereupon closing their corresponding switches 209 and 210. This puts the windings 201A and 202A in series, the windings 201B and 202B in series, and the windings 201C and 202C in series, all connected together in delta to the phase leads 203A, 203B and 203C leading to the pantograph shoes 21, 22 and 23, respectively.

It will, therefore, be apparent that normal three phase operation or single phase operation between two trolley wires may proceed.

It is to be observed that when the moving contact 58 arrives upon the stationary contact 63 to energize the changeover relay 189 automatically the coils 161 and 163 for the switches 25A and 25C are deenergized opening the outer leads 203A and 203C. At the same time, the auxiliary switches 155A and 155C are closed, resulting in the corresponding magnet valves 150 and 151 being operated and the pans 21 and 23 being lowered, and the spring pressure of the two outer phases being neutralized to the desired extent. The switches 25A and 25C will not be closed nor will the collector pans 21 and 23 be raised and spring pressure applied until the phase sensitive relay has definitely been shifted to such a position as will call for three phase or two wire single phase operation.

The phase sensitive relay 40 may perform additional functions, or other such relays may be employed for performing additional functions such as signaling in the cab of the locomotive or for automatic train control, or the like.

It is also to be observed that the control magnet may be carried on the locomotive and the phase sensitive relay disposed along the track for signaling or control purposes from the locomotive to a station along the track.

In Figure 18 I have shown in isometric view, and largely diagrammatic, the manner of supporting the overhead trolley shown in Figure 1. The trolley wires 16A and 16B extend continuously throughout the diagram and they are supported by continuous messenger cables 216A and 216B supported by overhead bridges such as 212, 213, 214 and 215. The upper discontinuous parts of trolley wire 16C is likewise suspended from a messenger wire 220 which is dead-ended on the bridge 213, as by means of the strain insulator 221. The trolley wire is led upwardly to said strain insulator 221 in order to provide a non-fouling approach for the corresponding collector pan. In like manner, the discontinuous portion of the trolley wire 18A which extends over the siding is carried by messenger wire 222 and the messenger wire and trolley wire are dead-ended on an insulator 223 suspended under tension on the bridge 213.

The curved portions 19B and 17C of the cross-over part of the trolley are suspended on suitable messenger wires, as are all of the trolley wires throughout, and the desired curved position, or approximately curved position, is secured by pulloff connections as indicated at 224 and 225, these pulloff connections being anchored to strain cables, such as 226 and 227. The strain cables are suitably insulated by strain insulators and are connected between the adjacent bridges such as 213 and 214.

Where the pulloff connections extend in proximity to different phases, the adjacent sections of the pulloff connections are insulated by suitable insulators, as indicated in Figure 18.

At the bridge 214 I have indicated suitable bracing for the trolley wires to prevent the lateral branches 19B and 17C from pulling the trolley wires or their messengers off to the right, as viewed in Figure 18. This bracing comprises a transverse strain cable 228 anchored upon the posts of the bridge 214 and broken into sections as by the insulators 229, 230, 231 and 232 into sections individual to the phases. The messenger wires, such as 216A, 216B and 216C, are suspended through the suspension insulators 233A, 233B and 233C and bracing connections diagonally disposed are connected between the parts, as shown in Figure 18. That is to say, between the trolley wire 16A and the insulators 229 and 230 short flexible connections extend diagonally upwardly and outwardly from the trolley wire 16A to the insulators 229 and 230. From the insulators 229 and 230 short diagonal connections, preferably of cable, extend upwardly and inwardly to the insulator 233A. The same bracing applies to the other two phases. Such bracing may be employed generally where it is desired to prevent sidesway or to prevent a lateral pull from displacing the position of the trolley wires or the messenger wires from which they are suspended.

The horizontal cable 228 is threaded between the corresponding messenger wires and their trolley wires so as to secure substantially a direct pull with maximum bracing effect both ways laterally.

In Figure 17 I have indicated a crossover between two parallel tracks. The trolley wires 235A and 235B over the left hand track are continuous throughout and the trolley wires 236B and 236C are continuous throughout over the right hand track. The trolley wires 235C and 236A are discontinued in the region of the turnout being suitably anchored with their messenger wires through suspension insulators upon the bridge members 238 and 239. The crossover trolley 241, which is common to the B phase trolley of both tracks, is discontinued at each end by being led upwardly with its messenger wire and anchored upon the bridges 237 and 240 beyond the region of the crossover, or at the ends of the same, and the desired curvature is secured by pulloff connections such as 242 and 243 connected at their inner ends to the messenger and trolley wire and, at their outer ends, anchored upon the strain cables 244 and 245, respectively.

Any suitable system of bracing the trolley wires and their catenary messenger wires may be employed and any suitable number of pulloff wires may be provided for holding the predetermined position of the crossover trolley 241, or any other part of the trolley or trolley suspension system.

The use of pulloff connections and strain cables, above referred to, may be employed upon curves, as illustrated in Figures 14, 15 and 16. It is, of course, desired to hold the trolley wires in register with the rails 2 and 3 and where the track curves, suitable strain cables, such as that indicated at 247 in Figures 14 and 16, are employed. This strain cable is connected to the posts of the supporting bridges or any other suitable supporting structure which will support the sidewise pull of the trolley.

The desirable function of this construction is to permit the trolley to remain substantially in the vertical plane in which it is normally suspended without appreciable lateral play. The pulloff connections 248, 249 and 250 are tied to both the messenger, such as 216A, and to the supported trolley, such as 16A for the A phase, and likewise for the other phases. The upward pressure of the pantograph pans tends to raise the trolley wires, such as 16A, 16B and 16C, but because of the relatively short connections such as 252A and 253A for the A phase, and like connections for the other phases, and the substantially direct horizontal pull any lifting of the trolley wire, such as 16A and the corresponding trolley wires for the other phases, will result in a lateral motion, that is, to the right, as viewed in Figure 16, of the strain cable 247 with the result that the trolley wires rise substantially vertically instead of swinging and being displaced sidewise, as in known constructions.

The pulloff wire, such as 248, is divided into three sections by suitable insulators such as 254A, 254B and 254C. As many such pulloff connections and a corresponding length of strain cable 247 as may be required to hold the trolley, may be provided.

At the overhead bridges, such as 255 and 256, suitable bracing may likewise be employed independently of the strain cable 247.

It is desirable to insert turnbuckles for adjustment of the various connections. It is to be understood that these are to be supplied wherever desired.

Various methods of suspension of the trolley may be employed. Several suitable forms are indicated in Figures 10 to 13, inclusive.

*Trolley suspension*

Figure 10:
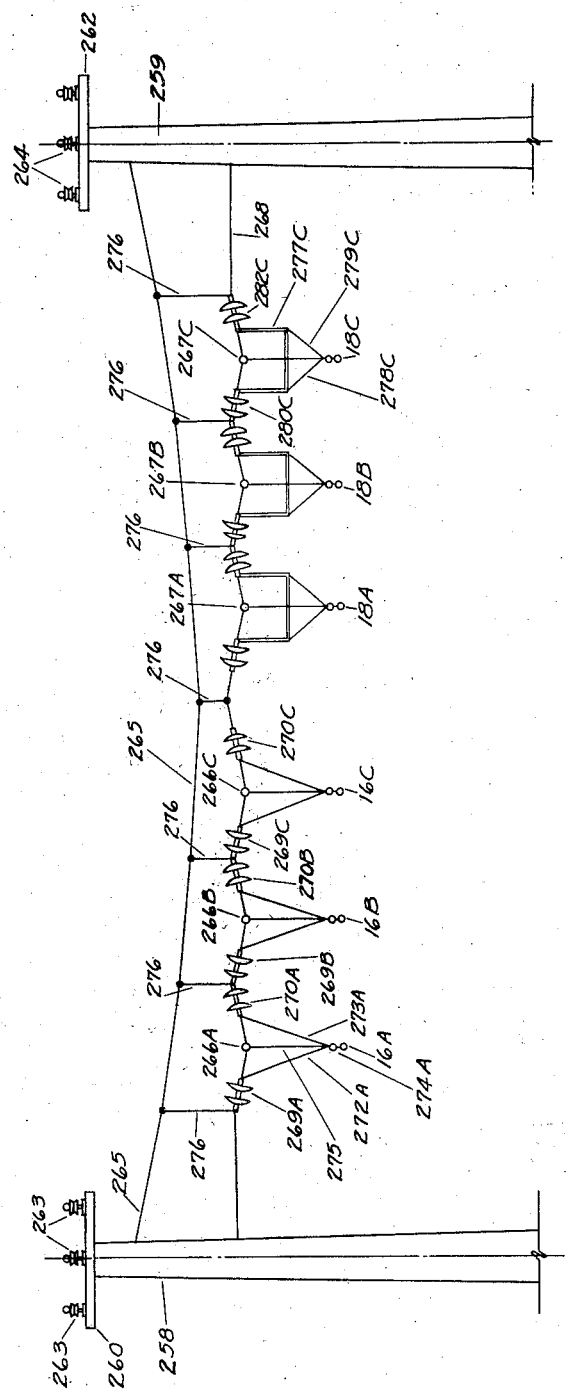
Figure 10 is a cross sectional view of a double track three phase trolley system showing two methods of bracing the trolley wires against lateral motion.

Figure 10 shows a typical overhead suspension suitable for the present traction system. Posts or towers such as 258 and 259 are set on opposite sides of the track, in this case a double trolley for double track line is shown. At the upper ends of these towers cross pieces 260 and 262 are mounted with suitable supporting insulators such as 263 and 264 mounted thereupon, respectively, for supporting conductors which may be signaling or communication circuits, neutral return circuits, or they may even be power supply wires. A transverse strain cable 265 connected at its ends to the posts 258 and 259 is suspended above the main longitudinal catenary cables, such as 266 for one track and 267 for the adjacent track.

An secondary cable 268 below the upper cross cable 265 is also anchored on the posts 258 and 259 and this latter cable is broken up into sections by pairs of insulators, one on each side of the corresponding catenary messenger, such as 266A. The insulators 269A and 270A are mounted in the secondary transverse cables 268 on opposite sides of the catenary messenger wire 266A and said catenary messenger wire is connected midway between these insulators. Diagonal cables 272A and 273A extend from the insulators 269A and 270A down to either the trolley wire 16A, or where a secondary messenger, such as 274A is employed, to such secondary messenger wire.

A drop connection, also preferably a cable like the cable connections 272 and 273, is indicated at 275. These drop connections 275 may be disposed at suitable points along the length of the trolley and messenger wires for supporting the weight of the trolley and secondary messenger wire 274 from the primary catenary messenger wire 266A. That is to say, the connection, such as 275 of various lengths corresponding to the distance between the catenary cable and its supported members, need not be in line with the pull wire 268.

Drop connections such as those indicated at 276 extend from the strain wire or cable 265 down to the secondary strain cable 268 to support the weight of the secondary strain cable 268 and the insulators, above referred to.

These drop connections 276 make connection between the pairs of insulators of different phase connections, for example, as between the insulators 270A and 269B thereby definitely interposing a ground connection between the insulators of adjacent phases. This minimizes the danger of interphase connections or flashovers by definitely interposing ground between adjacent phases.

In the construction shown at the right of Figure 10, U-shaped frame members such as 277 are employed in connection with shorter diagonal cables 278 and 279 to provide greater rigidity against lateral displacement of the trolley wires. The upper ends of the legs of the U are connected adjacent the inner ends of the corresponding insulators as, for example, at the inner ends of the insulators 280C and 282C. This construction, while it provides considerable rigidity against lateral displacement of the trolley wire, at the same time permits vertical floating of the trolley wire and its secondary messenger or of the trolley wire alone where no secondary messenger is employed. The primary catenary messenger wire 267C is connected in the cable between the two insulators 280C and 282C so that lateral displacement thereof is prevented.

While I have described the construction as applied to one specific phase in each case, it is to be understood that the other phases may be similarly constructed.

The construction shown at the right of Figure 10 likewise has the grounded drop connections interposed between insulators of adjacent phases.

In the construction shown in Figure 11 the lower or secondary strain cable 268 is carried at a level below the upper catenary messenger cable 266, the weight of the catenary messenger cable and its supported trolley being carried directly on drop connections such as 283A with the suspension insulators 284 interposed. The secondary cross cable or strain cable 268 may be carried on substantially a straight horizontal line because of the relatively short diagonal connections 272A and 273A, the chief function of which is to prevent sidesway with a minimum supporting function. It will be observed that in the construction of Figure 10 the primary catenary messenger, such as 266A, was supported through the corresponding section of the secondary strain cable 268 and the drop connections 276 to the upper cross strain cable 265. In the present construction the weight is taken subtantially directly upon the upper cross strain cable 265 and the lower or secondary cross strain cable 268 functions chiefly to brace the trolley wires against sidesway.

In the form shown in Figures 12 and 13, the posts 258 and 259 are provided with crossarms 287 and 288 for the connection of three cross strain cables 289, 290 and 292, which are connected at their opposite ends directly to the said crossarms 287 and 288. Below the crossarms 287 and 288 I provide similar crossarms 293 and 294 to which three secondary transverse strain cables 295, 296 and 297 are connected through insulators 298 at one end, and 299 at the other end. The secondary or lower cross cables 295, 296 and 297 are divided by pairs of insulators 301 and 302, the midpoint of which in each case is connected by drop connection 303 from the corresponding primary or upper transverse strain cable 289, 290 and 292.

The reason for the three transverse primary and secondary strain cables will be apparent when it is considered that each section of the secondary strain cable is insulated and connected to a corresponding phase wire of the trolley. For example, as shown in Figures 12 and 13, the central trolley wire 16B at the left of Figure 13 is suspended from the catenary 266B through the vertical drop connections such as 275B and at the same time diagonal cables 304B and 305B extend from the corresponding section, such as that shown for the B phase in Figure 13, to the secondary catenary messenger 274B. The primary catenary messenger 266B is preferably suspended by a rigid link 306B from the corresponding section 295 of the lower cross cable, this rigid connection being employed to prevent possible upward rise of the upper catenary messenger wire 266B from approaching the cables 296 and 297 which are, connected to the C and A phase conductors, respectively.

This construction gives a wider diagonal bracing by the use of the connection 304B and 305B and a fairly open type of construction which has certain inherent advantages. Obviously, as in the construction shown at the right of Figure 10, rigid frame members, such as the U frame members 277 shown therein, may be employed to replace the part of the connections 304B and 305B.

Motor drive

Figure 20:
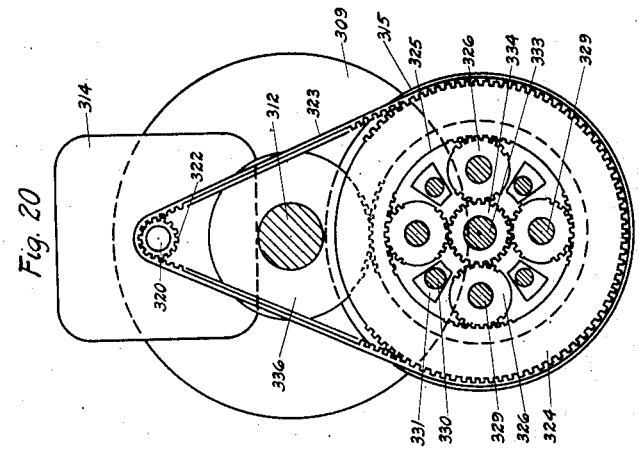
Figure 20 is a sectional view through the same.
Figure 21:
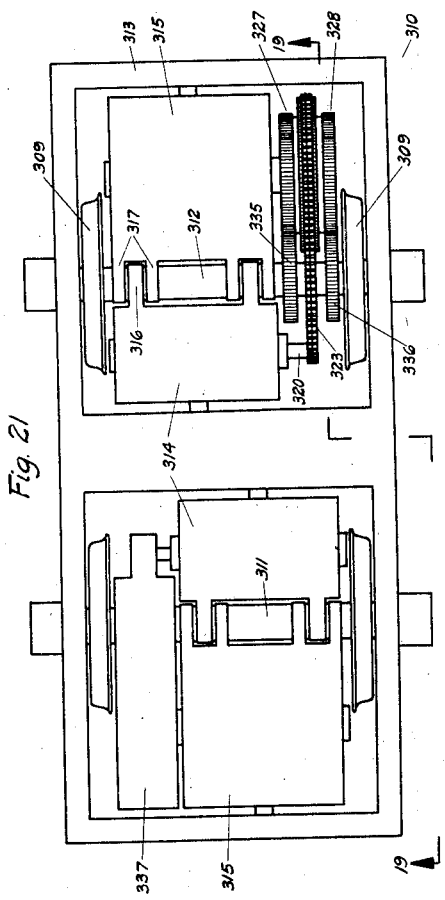
Figure 21 is a plan view of the truck shown in Figure 19.
Figure 19:
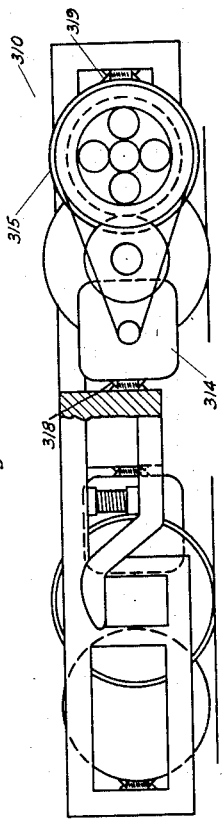
Figure 19 is a side elevational view of a form of drive suitable for multi-unit operation.

In Figures 19, 20 and 21 I have shown a form of motor drive which is suitable for use in connection with the three phase trolley system above described, particularly for multi-unit operation. That is to say, the truck 310 which I have shown is suitable for supplying a compact construction which may be disposed directly on the axles for supplying an amount of power suitable for driving a train of units each of which is provided with driving axles.

Where larger power is required, as, for example in a locomotive adapted to draw a train of trailers, much larger and more powerful motors are required and these should then be placed above the springs and the final element of the differential drive be connected through a flexible connection, such as a quill connection or a driver, or through connecting rods or cranks and connecting rods in a manner now known to those skilled in the art.

The truck 310 is provided with a pair of driving axles 311 and 312 provided with suitable driving wheels. These axles are suitably journaled in the frame 313. The frame is supported on suitable springs upon the axles 311 and 312 in a manner known to those skilled in the art.

Each axle, such as the axle 312, is provided with a direct current motor 314 and an alternating current motor 315 slung upon the axle by suitable straps or ears such as 316 and 317. The remote sides of the motor frames are connected through suitable noses, as indicated at 318 and 319 with cushioning springs interposed for supporting said outer ends of the frames upon the truck frame 313.

A direct current motor 314 has a motor shaft 320 which is provided with a driving pinion 322 and this pinion meshes with a toothed driving chain 323 which is connected with a ring gear 324 having external teeth meshing with the chain 323 and having internal teeth, as indicated at 325, forming an orbit gear for the planet pinions 326. A cage for the planet gears 326 is provided by two side plate members with gear teeth provided upon their peripheries forming the gears 327 and 328. These gears 327 and 328 are connected together by the bearing pins or shafts 329 and bolts 330 extending through spacer blocks or posts 331.

The spacer blocks or posts 331 space the gears 327 and 328 apart a predetermined distance and in conjunction with the bolts 330 form a rigid cage member.

A shaft 333 of the alternating current motor 315 bears a sun pinion 334 meshing with the planet pinions 326. Suitable bearings are provided between the sun pinions, the planet pinions and the ring gear 325 by providing cylindrical roller plates upon opposite sides of each of these gears, these plates being provided with cylindrical surfaces accurately registering with the pitch circles of the meshing gears so that rolling contact between such cylindrical surfaces may be obtained. This feature is disclosed in my copending application Serial No. 357,540, filed April 23, 1929.

The two gears 327 and 328 in turn mesh with bull gears 335 and 336, respectively, fixed upon the driving axle 312.

A grease tight casing or housing 337, shown at the left of Figure 20, is adapted to enclose the gears and the driving chain. The driving chain 323 provides an ideal flexible connection for relatively small power transmission but for greater power transmission it occupies more space axially of the motor shafts than is desirable. In the present construction where the power is relatively small it forms an ideal connection for multi-unit drive.

It is particularly useful in the present connection where the rating of the direct current motor 314 needs to be only of the order of one-fifth of the total output of both motors of a driving set. The unit shown in the left hand part of the truck frame 313 is of the same character described in connection with the right hand unit.

A direct current motor 314 is adapted to be supplied through a reversible converter which preferably consists of a motor generator set and the alternating current motor 315 is supplied directly from the secondary side of the transformer 204. The control for governing the operation of these motors is disclosed in my copending application, 365,832.

Obviously, a different form of drive from the specific one shown in Figures 20 to 22, inclusive, may be employed in connection with the other features herein disclosed. Likewise, it is to be understood that the relay 40, which I have referred to as the phase sensitive relay, may be employed in conjunction with track contacts or other positional control devices instead of the track magnets which I have shown. Known forms of inductive mechanisms disposed partly on the moving locomotive and partly along the track, likewise, may be employed.

A particular advantage of the track magnets which I have shown is that due to the relatively low reluctance of iron the inductive effect of the windings of the track magnets upon the windings of the axle coil is effective along a considerable length of the track.

The reluctance of air to magnetic flux is very high as compared with iron even though the same is of relatively low permeability. If desired, pole pieces may be extended along the track rails without departing from the invention. The axles such as 27 are sufficiently separated magnetically from the truck frame or may be so separated by bronze bearings. Also instead of employing one coil a plurality of coils on the axles may be utilized or a special magnetic bridging member may be carried by the locomotive.

While I have shown the upper and lower air cylinders such as 146 and 135 connected together for joint operation by the single magnet valve 150, it is to be understood that separate air lines controlled by separate magnet valves may be employed particularly where the two effects are to be secured in succession instead of simultaneously or where either operation is to be performed alone. The two magnet valves may be connected in parallel for simultaneous operation.

A reversing switch is preferably connected in the leads between the trolley and the transformer as that the proper phase relationship is preserved when the locomotive is turned as on a Y track or on a turntable. This is shown in my copending application Serial No. 365,832.

I do not intend to be limited to the details shown or described since I conceive my invention to be laid in a new field.

I claim:

1. In an electric traction system, a track having a track switch, a three phase three wire trolley on each side of the switch, two of said trolley wires being continued throughout and over the switch.

2. In an electric traction system, a track having a track switch, a three phase three wire trolley on each side of the switch, two of said trolley wires being continuous over the switch and a lateral branch from one of said two trolley wires extending out laterally at said track switch.

3. In an electric traction system, a three phase trolley having three wires suspended on substantially the same level, two of said trolley wires being continuous along the track and over the switch, one of said trolley wires having a branch extending out laterally at said switch, and a third trolley wire extending out parallel with said branch at said switch.

4. In an electric traction system, parallel tracks having a crossover, a three phase three wire trolley for each track, two of the trolley wires of each track being continuous throughout, the adjacent trolley wires of the two tracks being discontinuous and a branch from the middle trolley wire of each track extending over the crossover between the tracks.

5. In an alternating current traction system having continuously conductive rails forming a ground return for driving the vehicle, a system of communication between a moving track vehicle and a stationary receiver comprising a stationary coil and a coil carried by the vehicle and a phase sensitive relay connected to one of said coils and a source of fixed frequency connected to the other coil, said rails serving as a part of the magnetic circuit between said coils.

6. A system of communicating intelligence between a moving track vehicle and a station comprising magnetic rails, a vehicle axle, a stationary coil and a coil carried by the vehicle, alternating current of fixed phase for one of the coils and a source of alternating current of selectible phase for the other coil and a phase sensitive relay under the control of said coils said magnetic rails and said vehicle axle serving as a part of the magnetic circuit between said coils.

7. The method of communicating from a track station to a moving track vehicle which comprises, magnetizing the track by alternating current of a selected phase relation, bridging the magnetized tracks by the moving axle of the track vehicle to form a magnetic loop having an alternating flux of selected phase relation, inducing a current flow of the selected phase relation by the magnetic flux through the axle, establishing an alternating current of standard phase relation and subjecting a movable indicating element to the combined actions of the current flow of selected phase relation and the current flow of standard phase relation.

8. The method of communicating between a track station and a moving track vehicle which comprises, magnetitzing the tracks by alternating currents of one phase relation, bridging the magnetized tracks by a magnetic member, carrying through said magnetic member an alternating magnetic flux of the first named phase relation, inducing a current flow of the first phase relation by interlinking a conductor with the aforesaid magnetic flux, establishing an alternating current of different phase relation and moving an indicator element to a predetermined position by the reaction between said two alternating currents of different phase relations.

9. In an electric traction system, a traction vehicle, a track therefor comprising a track switch, a plural wire trolley comprising a laterally extending trolley wire over the track switch, a current collector on the traction vehicle comprising separately movable collector contacts, track coils adapted to be energized by current of selectable phase relationship in accordance with the position of the track switch, a phase sensitive relay carried by the vehicle and adapted to be influenced by said track coil, and means governed by the phase sensitive relay for moving a collector contact.

10. In an electric traction system, a traction vehicle, tracks therefor comprising a track intersection, a plural wire trolley comprising intersecting trolley conductors at said track intersections, a plural contact collector carried by the vehicle, one of said contacts being depressible independently of another, a track coil adjacent the track intersection adapted to be energized by alternating current of selectable phase relationship, a phase sensitive relay carried by the vehicle and adapted to be governed by the track coil, and means controlled by said relay for moving said contact.

11. In an electric traction system, a traction vehicle having a traction motor, tracks for the vehicle, said tracks comprising a track intersection, a plural wire trolley comprising intersecting trolley conductors at said track intersections, a plural contact collector carried by the vehicle, one of said contacts being movable independently of another, a track coil adapted to be energized by alternating current of selectable phase relationship, a phase sensitive relay carried by the vehicle and adapted to be governed by the track coil, switching means governing the circuit of the traction motor, said switching means being controlled by the phase sensitive relay and means controlled by the phase sensitive relay for moving said selector contact.

12. In an electric traction system, a traction vehicle, a traction motor for the vehicle, tracks for the vehicle comprising a track intersection, a plural wire trolley comprising intersecting trolley conductors at said track intersections, a plural contact collector carried by the vehicle for cooperation with the trolley, a circuit between the trolley and the traction motor, a track coil adapted to be energized by alternating current of selectable phase relationship, a phase sensitive relay carried by the vehicle and adapted to be governed by the track coil, and a switch in the circuit between the collector and the motor, said switch being governed by said relay.

13. In an electric traction system, a traction vehicle, tracks therefor comprising a track intersection, a plural wire trolley comprising intersecting trolley conductors at said track intersection, a plural contact collector carried by the vehicle, one of said contacts being movable independently of another, a track coil adapted to be energized by alternating current of selectable phase relationship, a phase sensitive relay carried by the vehicle, and adapted to be governed by the track coil, means controlled by the relay for moving said contact, a second track coil adapted to be energized by alternating current of a phase relationship different from the phase relationship of the first coil, said phase sensitive relay being responsive to said second track coil to cause the contact to be moved to a different position.

14. In an electric traction system, a traction vehicle, a traction motor therefor, tracks for the vehicle comprising a track intersection, a plural wire trolley comprising intersecting trolley conductors at said track intersection, a plural contact collector carried by the vehicle, one of said contacts being movable independently of another, a circuit between said collector and the traction motor, a track coil adapted to be energized by alternating current of selectable phase, a phase sensitive relay carried by the vehicle and adapted to be governed by the track coil, a switch in the circuit between the collector and the track motor, said switch being controlled by the relay, means controlled by the relay for moving said contact and a second track coil adapted to be energized by alternating current of a phase different from the phase of the first coil, said relay being responsive to the action of said second track coil.

15. In an electric traction system, a traction vehicle, tracks therefor comprising a track intersection, a plural wire trolley comprising intersecting trolley conductors at said track intersection, a plural contact collector carried by the vehicle, one of said contacts being movable independently of another, track coils upon opposite sides of the track intersection, said track coils being adapted to be energized by alternating current of selectable phase relationship, a phase sensitive relay carried by the vehicle and adapted to be governed by the track coils and means controlled by the relays for governing the position of said one contact.

16. In an electric traction system, a traction vehicle, tracks therefor comprising a track intersection, a plural wire trolley comprising intersection trolley conductors at said track intersection, a plural contact collector carried by the vehicle, one of said contacts being movable independently of another, track coils upon opposite sides of the track intersection, said track coils being adapted to be energized by alternating current of selectable phase relationship, a phase sensitive relay carried by the vehicle and adapted to be governed by the track coils and means controlled by the relays for governing the position of said one contact, a second track coil disposed outside the region of the track intersection and beyond the first named track coil, said second track coil adapted to be energized by alternating current of a phase different from a phase impressed on the first named coils, said phase sensitive relay being responsive to said second named track coil.

17. In an electric traction system, a traction vehicle, tracks therefor comprising a track switch, a plural wire trolley comprising intersecting trolley conductors at said track switch, a plural contact collector carried by the vehicle, one of said contacts being movable independently of another, a track coil adapted to be energized by alternating current of selectable phase relationship, means controlled by the condition of the track switch for selecting the phase relationship of currents impressed upon said track coil, a phase sensitive relay carried by the vehicle and adapted to be governed by the track coil, and means controlled by the relay for governing the position of said contact.

18. In a system of the class described, tracks comprising a track switch, a plural wire trolley comprising a branch trolley conductor at said switch, track coils on each side of the switch, a selector switch controlled by the position of the track switch and a source of different phase currents connectable through said coils and through said selector switch.

19. In combination a track having a track switch, track coils adjacent said switch, a three phase trolley over said track, a selector switch cooperating with the track switch for controlling the phase of current impressed upon the track coils in accordance with the position of the track switch.

20. In combination a railroad track having a track switch. a three phase trolley for the track, a track coil at the approach to the switch and a second track coil beyond the switch, means for impressing currents of one phase upon the second named coil, and means controlled selectively by the position of the track switch for governing the phase relationship of the currents impressed upon the first track coil.

21. In a railway system, a railway track including a track switch, magnetic members bridging the track on each side of the switch, coils for said magnetic members and means controlled by the position of the switch for energizing said coil members.

22. In combination a railroad track including a switch, magnetic members bridging the track rails on each side of the track switch, an electrical selector switch conjointly controlled with the track switch, a source of alternating current of multi-phase and coils for said magnetic members energized by current of a phase determined by said selector switch.

23. In combination a railroad track comprising a track switch, coils on each side of the switch, an electrical selector switch controlled by the position of the track switch, a source of multi-phase current and connections from said source to said coils, said connections being controlled by the selector switch.

24. In an electric railway system, a track, a track vehicle having a motor operable on three phase or single phase current, a trolley having a three phase section and a single phase section, a collector adapted to collect current from the trolley for three phase operation or for single phase operation, a supply circuit from the collector to the motor, said collector comprising shiftable contacts adapted to be moved upon motion of the vehicle from one section to the other, and means comprising a positional control device positioned at the track and a device carried by the vehicle for controlling the shifting of said collector contacts automatially.

25. In an electric railway system, a track vehicle having a motor operable on three phase or single phase current, a trolley having a three phase section and a single phase section, a collector adapted to collect current from the trolley for three phase operation or for single phase operation, a control switch for controlling the connection of the collector and the motor, and means comprising a control device positioned at the track and a device carried by the vehicle for controlling automatically the operation of said control switch.

26. In an electric railway system, a track, a track vehicle having a motor operable on three phase or single phase current, a collector adapted to collect current from the trolley for three phase operation or single phase operation, a supply circuit from the collector to the motor, said collector comprising shiftable contact adapted to be moved upon motion of the vehicle from one section to the other, a control switch for controlling the supply circuit of the motor and means comprising a control device positioned at the track and a device carried by the vehicle for controlling the shifting of said collector contact and the operation of said control switch.

27. In an electric railway system, a track, a track vehicle having a motor operable on three phase or single phase current, a collector adapted to collect current from the trolley for three phase operation or single phase operation, a supply circuit from the collector to the motor, said collector comprising a shiftable contact adapted to be moved upon motion of the vehicle from one section to the other, a control switch for controlling the supply circuit of the motor, and means comprising a control device positioned at the track and a device carried by the vehicle for controlling the shifting of said collector contact and the operation of said control switch, one of said devices comprising a phase sensitive relay.

28. A current collector for a multi-wire trolley comprising a collapsible frame, contact members mounted in separately insulated relation on said frame, and means independent of the collapsible frame for depressing one of the contact members independently of the other contact members.

29. A current collector for a plural wire trolley comprising a collapsible frame, means for collapsing the frame, means for extending the frame, a plurality of contact members mounted on the frame and means for selectively depressing individual contact members.

30. A current collector for a plural wire trolley comprising a collapsible frame, arms pivotally mounted on the upper end of the frame, contact members carried on the arms and means for swinging one or more of the arms selectively downwardly to disengage the trolley.

31. A current collector for plural wire trolley system comprising a collapsible frame, movable contact members mounted on the frame, air cylinders for depressing selectively one or more of said contacts, and means selectively controlled for energizing said air cylinders.

32. A current collector for three phase alternating current comprising a pantograph frame, arms pivoted on the upper end of the pantograph frame, contact members carried by the arms, spring means for applying the contacts to the trolley wires, and air cylinders for overcoming the spring means of two of said contact members.

33. A current collector for three phase current comprising a pantograph frame consisting of three electrically separate mechanically connected sections, each section having a movable contact member, spring means for each section for supplying the contact members to the trolley wires, means for opposing all of said spring means for collapsing the pantograph, said means being controllable to oppose only part of the pressure of said spring.

34. In a current collector for three phase current, a collapsible pantograph frame comprising three electrically separate sections, contact members on substantially the same level for each of said sections, spring means for each section tending to raise the pantograph and air cylinders for each section for opposing the action of said spring means.

35. A current collector for three phase current comprising a pantograph frame longitudinally sectionalized into three electrically separate parts, spring means for each part tending to raise the pantograph, movable contact members for the three parts, spring means for each contact member for applying it to the trolley wire, air cylinders for the sections for opposing the raising spring, and air cylinders for two of said contact members for opposing the spring pressure applying means of the contact members.

36. In a pantograph collector a pair of arms pivoted together intermediate their length, a guide rod connected to one arm and slidably guided with respect to the other arm, a bell crank pivoted to the upper end of said one arm, a contact on one end of the bell crank, a spring connected between the other end of the bell crank and said guide rod for raising the contact.

37. A pair of arms hinged together on a horizontal shaft, a guide rod connected to one arm and slidably guided with respect to the other arm, a lever pivoted to the upper end of said one arm, a contact on one end of the lever, and a spring connected between the other end of the lever and said guide rod for raising the contact.

38. A pair of arms hinged together on a horizontal shaft, a guide rod connected to one arm and slidably guided with respect to the other arm, a lever pivoted to the upper end of said one arm, a contact on one end of the lever, and a spring connected between the other end of the lever and said guide rod for raising the contact, and an air cylinder for opposing the spring and lowering the contact.

39. In a pantograph collector a pair of arms hinged on a horizontal axis, spring means tending to spread the upper ends of said arms, an air cylinder for opposing said spring means, a guide rod connected to the upper end of one arm and slidably guided with respect to the upper end of the other arm, a bell crank lever pivoted to the upper end of said one arm, a contact on the upper end of the bell crank, a spring connected between the lower end of the bell crank and said guide rod for raising the contact, and an air cylinder for opposing said latter spring.

40. A current collector for three phase alternating current comprising a pantograph frame having three electrically insulated sections mechanically connected, collector arms mounted on each of the three sections and means for selectively lowering either one or both of the outer pantograph pans.

41. In combination a three phase three wire trolley having a laterally extending branch and having two continuous trolley wires, a vehicle having a current collector comprising three individually movable collector contacts for engaging the trolley wires, and positional means disposed adjacent the approach to the branch for causing the lowering of one of the collector contacts as the vehicle approaches said branch.

42. A current collector for a three phase trolley comprising a support, spring means for raising said support, three contacts carried by the support, the outer two contacts being separately depressable, means for selectively depressing one or both of said outer two contacts and means for graduating the action of said spring means to the number of contacts which are raised.

43. In combination a vehicle, a traction motor for the vehicle, a current collector for a three phase trolley mounted on the vehicle, said traction motor being operable on single phase or on three phase current, connections from said current collector to said motor, switching means for changing the connections of the motor to adapt it to operate on three phase current or on single phase current, said collector having three contacts, means for selectively depressing one or two of said contacts, and means governing the depressing means and the switching means.

44. In combination a source of three phase current, a phase sensitive relay having a power component coil and a reactive component coil, both coils energized from one phase of said source of three phase current to produce a rotating field, a movable contact, a magnetizing coil adapted to be selectively energized by one of the other phases of said source and contacts controlled by the position of the movable members.

45. In phase sensitive relay, a pair of angularly displaced coils, means in series with the coils for angularly displacing the phase relationship of alternating current supplied thereto, means for supplying single phase current to said coils, a movable armature member, contacts controlled by the position of said armature members, a magnetizing coil and means for supplying a current of selected phase to said magnetizing coil.

46. In combination a track having magnetic rails, a bridging magnetic member, a coil for said member, a source of alternating current for said coil, a track vehicle having a magnetic axle and magnetic track wheels thereupon, a coil encircling said axle and magnetically interlinked therewith and a relay on the vehicle governed by said second coil and being sensitive to the phase of the current in the first coil.

47. In combination a track having magnetic rails, a bridging magnetic member for said rails, a coil magnetically interlinked with said magnetic member, a track vehicle having a traveling magnetic member bridging said rails, a coil magnetically interlinked with said second bridging member, a source of alternating current connected to one of said coils and a relay connected to the other of said coils.

In witness whereof I hereunto subscribe my name this 21st day of May, A. D. 1929.

ALLEN M. ROSSMAN.